US011221669B2

(12) United States Patent
White et al.

(10) Patent No.: US 11,221,669 B2
(45) Date of Patent: Jan. 11, 2022

(54) NON-VERBAL ENGAGEMENT OF A VIRTUAL ASSISTANT

(71) Applicant: Microsoft Technology Licensing, LLC, Redmond, WA (US)

(72) Inventors: Ryen William White, Woodinville, WA (US); Andrew David Wilson, Seattle, WA (US); Gregg Robert Wygonik, Duvall, WA (US); Nirupama Chandrasekaran, Seattle, WA (US); Sean Edward Andrist, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 15/849,160

(22) Filed: Dec. 20, 2017

(65) Prior Publication Data
US 2019/0187787 A1 Jun. 20, 2019

(51) Int. Cl.
*G06F 3/01* (2006.01)
*G06K 9/00* (2006.01)
(Continued)

(52) U.S. Cl.
CPC .............. *G06F 3/013* (2013.01); *G06F 3/012* (2013.01); *G06F 3/017* (2013.01);
(Continued)

(58) Field of Classification Search
CPC ........ G06F 3/167; G06F 17/2785; G06F 9/44; G06F 9/453; G06F 17/28; G06F 3/013;
(Continued)

(56) References Cited

U.S. PATENT DOCUMENTS

2012/0146891 A1* 6/2012 Kalinli ................. H04N 19/115
345/156
2013/0304479 A1* 11/2013 Teller ...................... G06F 3/013
704/275
(Continued)

OTHER PUBLICATIONS

"International Search Report and Written Opinion Issued in PCT Application No. PCT/US18/065299", dated Mar. 22, 2019, 14 Pages.
(Continued)

*Primary Examiner* — Phuong H Nguyen
(74) *Attorney, Agent, or Firm* — Liang IP, PLLC

(57) ABSTRACT

Systems and methods related to engaging with a virtual assistant via ancillary input are provided. Ancillary input may refer to non-verbal, non-tactile input based on eye-gaze data and/or eye-gaze attributes, including but not limited to, facial recognition data, motion or gesture detection, eye-contact data, head-pose or head-position data, and the like. Thus, to initiate and/or maintain interaction with a virtual assistant, a user need not articulate an attention word or words. Rather the user may initiate and/or maintain interaction with a virtual assistant more naturally and may even include the virtual assistant in a human conversation with multiple speakers. The virtual assistant engagement system may utilize at least one machine-learning algorithm to more accurately determine whether a user desires to engage with and/or maintain interaction with a virtual assistant. Various hardware configurations associated with a virtual assistant device may allow for both near-field and/or far-field engagement.

20 Claims, 13 Drawing Sheets

(51) Int. Cl.
*G10L 15/22* (2006.01)
*G10L 15/24* (2013.01)
*G06N 20/00* (2019.01)
*G06F 3/0484* (2013.01)
*G06N 20/10* (2019.01)
*G06F 3/16* (2006.01)
*G06N 3/00* (2006.01)

(52) U.S. Cl.
CPC .......... *G06F 3/04842* (2013.01); *G06F 3/167* (2013.01); *G06K 9/00302* (2013.01); *G06N 3/006* (2013.01); *G06N 20/00* (2019.01); *G06N 20/10* (2019.01); *G10L 15/22* (2013.01); *G10L 15/24* (2013.01)

(58) Field of Classification Search
CPC ...... G06F 3/017; G06F 3/04842; G06F 3/012; G10L 15/22; G10L 15/26; G10L 2015/225; G10L 15/08; G10L 25/63; G10L 15/24; G06N 20/10; G06N 3/006; G06N 20/00; G06K 9/00302
See application file for complete search history.

(56) References Cited

U.S. PATENT DOCUMENTS

| | | | |
|---|---|---|---|
| 2014/0104392 A1* | 4/2014 | Thorn | H04N 7/147 348/46 |
| 2015/0154001 A1 | 6/2015 | Knox et al. | |
| 2016/0063989 A1* | 3/2016 | Deleeuw | G10L 15/02 345/473 |
| 2016/0132290 A1* | 5/2016 | Raux | G06F 3/013 704/275 |
| 2016/0246384 A1* | 8/2016 | Mullins | G06F 3/011 |
| 2017/0177080 A1 | 6/2017 | Deleeuw | |
| 2017/0235361 A1 | 8/2017 | Rigazio et al. | |
| 2017/0322679 A1 | 11/2017 | Gordon | |
| 2018/0288477 A1* | 10/2018 | Gupta | H04N 21/4532 |
| 2018/0314689 A1* | 11/2018 | Wang | G10L 15/22 |

OTHER PUBLICATIONS

"Gaze Locking: Passive Eye Contact Detection for Human-Object Interaction", Retrieved from <<http://www.cs.columbia.edu/CAVE/projects/gaze_locking/>>, Retrieved On: Nov. 16, 2017, 3 Pages.

"Tobii Pro X2-60 eye tracker", Retrieved from <<https://www.tobiipro.com/product-listing/tobii-pro-x2-60/>>, Retrieved On: Nov. 16, 2017, 10 Pages.

"Xkcd Listening", Retrieved from <<https://xkcd.com/1807/>>, Retrieved On: Nov. 16, 2017, 2 Pages.

Brumitt, et al., ""Let There Be Light!" Comparing Interfaces for Homes of the Future", In Technical Report of MSR-TR-2000-92, Sep. 21, 2000, 10 Pages.

Ferrer, William Robert, "For 4 Seattle women called Alexa, it's funny, frustrating to share name with Amazon device", Retrieved from <<https://www.seattletimes.com/life/for-4-seattle-women-called-alexa-its-fun-frustrating-to-share-name-with-amazon-device/>>, Jul. 21, 2017, 8 Pages.

Shell, et al., "ECSGlasses and EyePliances: using attention to open sociable windows of interaction", In Proceedings of Symposium on Eye Tracking Research & Applications, Mar. 22, 2004, pp. 93-100.

\* cited by examiner

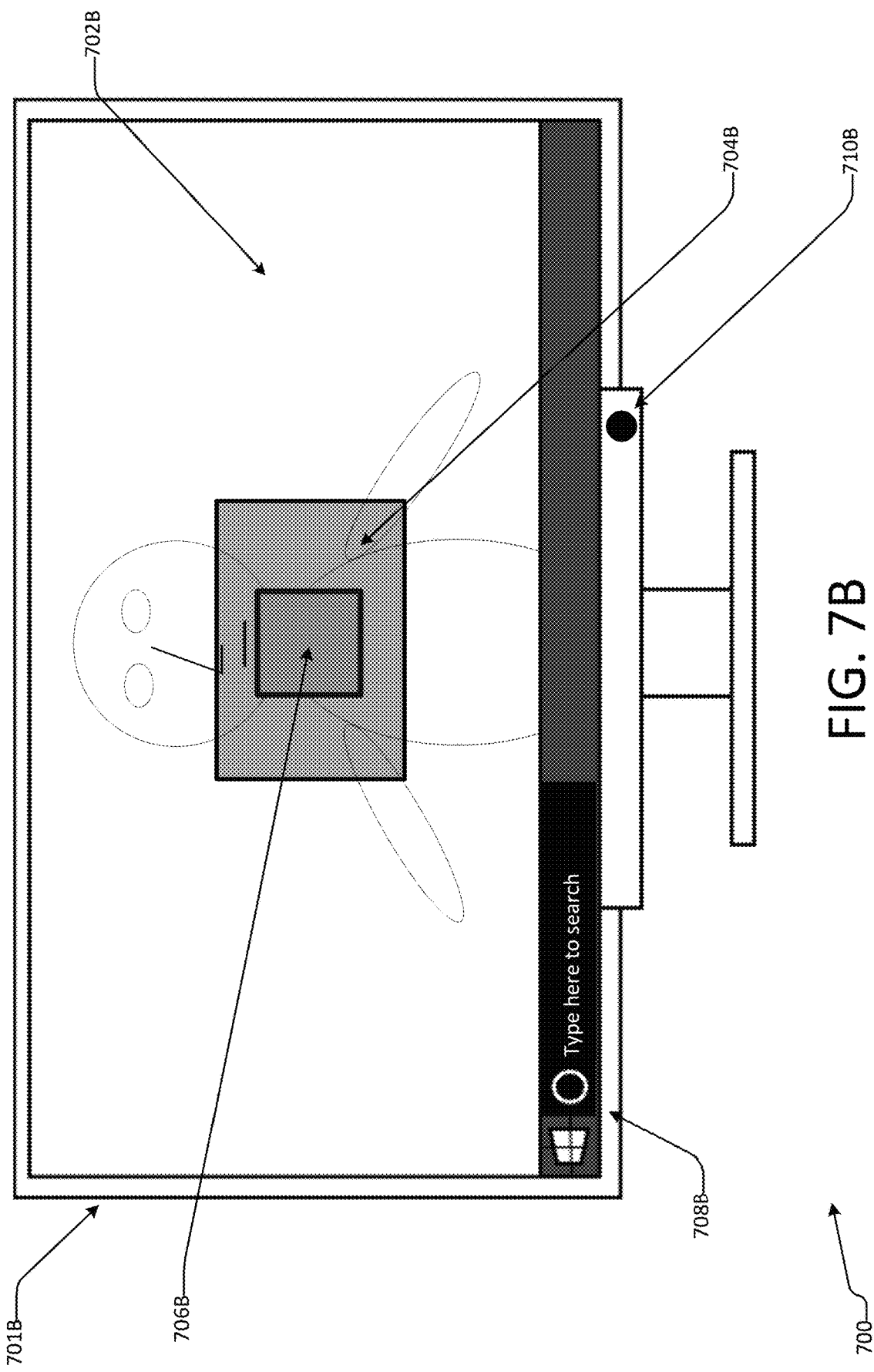

NON-VERBAL ENGAGEMENT OF A VIRTUAL ASSISTANT

BACKGROUND

A virtual assistant is a software agent that can perform tasks for an individual. Some examples of virtual assistants currently on the market include Microsoft Cortana®, Apple Siri®, Google Assistant®, and Amazon Alexa®. Virtual assistants are most commonly engaged through text or voice. Today, the predominant means of activating a virtual assistant via voice is by calling its name and speaking a command: "Cortana, what is the weather forecast?" This primary method of activation holds true when a user is nearby a machine (e.g., in front of a desktop PC or laptop) or when a user is far away (e.g., addressing a smart speaker, such as an Amazon Echo®). Requiring activation of a virtual assistant through the use of attention words (or "wake words") can be unnatural and cumbersome, especially when a user is required to use an attention word before every dialogue change. In contrast, initiating and maintaining natural human-to-human conversations, particularly where multiple individuals are involved, does not require use of attention words or even audible triggers, but rather may be initiated and transitioned between the various individuals through subtle gestures and/or eye gaze data.

It is with respect to these and other general considerations that example aspects, systems, and methods have been described. Also, although relatively specific problems have been discussed, it should be understood that the examples should not be limited to solving the specific problems identified in the background.

SUMMARY

Implementations described and claimed herein address the foregoing problems by providing systems and methods for initiating and/or maintaining a conversation with a virtual assistant through eye-gaze technology and other non-verbal signals. Eye gaze or eye tracking is a way of accessing an electronic device or communication aid using an input device (e.g., mouse) that is controlled by a user's eye or eyes. Eye-gaze interaction techniques may enable users to communicate and interact with electronic devices without the use of tactile input (e.g., using hands and fingers for typing or mouse activation) or verbal input (e.g., using speech-to-text typing). In aspects, input that is non-verbal and non-tactile may be referred to herein as "ancillary input" or "attributes" of eye-gaze data and may include, but are not limited to, input received based on gaze fixation data, facial recognition data, motion or gesture detection, gaze direction data, head-pose or head-position data, and the like. For example, users with certain motor disabilities may be able to communicate with eye gaze technology. With regard to virtual assistants, rather than requiring the use of attention words to initiate and maintain interaction with the virtual assistant, the example embodiments disclosed herein use eye-gaze technology and other non-verbal methods to initiate and maintain interaction. The example embodiments disclosed herein use a combination of various hardware devices and machine-learning algorithms to determine when a virtual assistant should be activated, how long that activation should be maintained, and when the activation should cease.

In this way, a user is not required to articulate an attention word or words each time the user desires to initiate and/or maintain interaction with a virtual assistant. Rather the user may initiate and/or maintain interaction with a virtual assistant more naturally and may even include the virtual assistant in a human conversation with multiple speakers. In one example aspect, the initiation and maintenance of a conversation with a virtual assistant may be determined by eye-gaze. If the electronic device in which the virtual assistant operates (hereinafter "virtual assistant device") detects eye-gaze signals from a user, the virtual assistant may activate and initiate a conversation with the user. In another example aspect, a user may make a physical gesture towards the virtual assistant device. The engagement system may determine that the gesture is an indication that the user desires to interact with the virtual assistant, and as such, the virtual assistant may initiate a conversation with the user. In further example aspects, a user may interact with the virtual assistant through a combination of both non-verbal and verbal methods. For example, a user may look at the virtual assistant device and say, "Hello." The engagement system may receive both eye-gaze signals, as well as the verbal signal "Hello," and determine that the user desires to interact with the virtual assistant.

The example embodiments disclosed herein also utilize machine-learning algorithms to further determine whether a user desires to interact with the virtual assistant. For example, a virtual assistant device may be equipped with at least one camera and/or at least one infrared sensor. The hardware of the electronic device may be equipped to receive and process at least one spatial topology. As such, the virtual assistant engagement systems and methods disclosed herein may become more familiar with the physical surroundings in which the virtual assistant device is located as the device spends more time in that physical environment. Furthermore, the machine-learning algorithms may utilize face recognition technology to collect user-specific data and adapt to user-specific preferences, actions and/or gestures, to more accurately determine when a user desires to initiate and/or maintain interaction with a virtual assistant.

In an aspect, a processor-implemented method for engaging a virtual assistant is provided. The method includes receiving eye-gaze data as input on an electronic device and processing the eye-gaze data to determine whether a user's gaze is directed toward a virtual assistant. The method further includes analyzing one or more attributes of the eye-gaze data to determine whether the user intends to engage the virtual assistant and applying additional processing to verify that the user intends to engage the virtual assistant. Additionally, the method includes providing an indication that the virtual assistant is ready to engage with the user.

In another aspect, a computing device, including at least one processing unit and at least one memory storing processor-executable instructions, is provided. When executed by the at least one processing unit, the processor-executable instructions cause the computing device to receive eye-gaze data as input and process the eye-gaze data to identify at least one location of a user's gaze on a display interface of the computing device. Based on the location of the user's gaze, the processor-executable instructions cause the computing device to determine whether the user intends to engage the virtual assistant and apply additional processing to verify that the user intends to engage the virtual assistant. Additionally, the processor-executable instructions cause the computing device to provide an indication that the virtual assistant is ready to engage with the user.

In yet another aspect, a processor-readable storage medium is provided. The processor-readable storage medium stores instructions that when executed by one or more processors of a computing device perform a method for analyzing eye-gaze input. The method includes receiving eye-gaze data as input on an electronic device and processing the eye-gaze data to determine at least one direction of a user's gaze using at least one machine-learning algorithm. The method further includes analyzing one or more attributes of the eye-gaze data to determine that the user intends to engage a virtual assistant and providing an indication that the virtual assistant is ready to engage with the user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 7B illustrates an example of an engaged virtual assistant.

DETAILED DESCRIPTION

Figure 1:
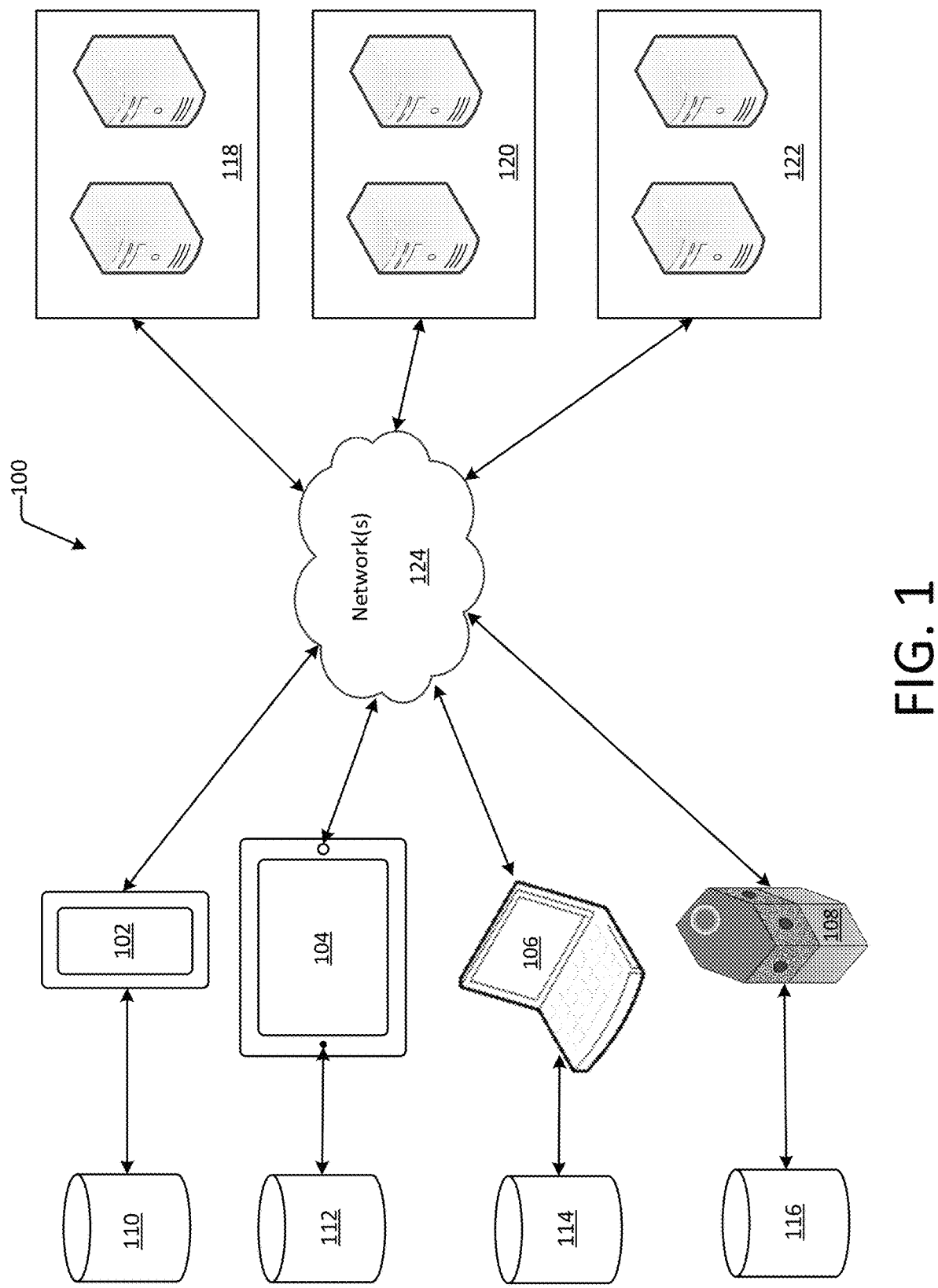
FIG. 1 illustrates an example of a distributed system for non-verbally engaging a virtual assistant.

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Implementations described and claimed herein describe example aspects of systems and method for non-verbally engaging a virtual assistant. In aspects, a virtual assistant may be engaged through the receipt and processing of eye gaze data, including, but not limited to, eye fixation time, eye glint data, pupil dilation and constriction, blink rates, and corneal reflection, among others. Moreover, attendant or attribute data may be collected or retrieved, in at least some cases, at the same or similar time as the eye-gaze data (referred to herein as "attributes" of eye-gaze data). An "attribute" of eye-gaze data may include but is not limited to an eye-gaze signal, a physical gesture, a body position, a head pose (or position), a facial feature, a facial expression, or any combination thereof. In contrast to eye-gaze data, an "eye-gaze signal" may refer to referential or statistical data, such as thousands of pre-sorted images that indicate whether a person is looking at or away from a device, predefined gestures, corneal reflection indices associated with gaze direction or gaze location information, historical data associated with a particular user, etc. In still further examples, contextual data may be collected or retrieved, in at least some cases, at the same or similar time as the eye-gaze data. Contextual data may include but is not limited to environmental topology data (e.g., ambient temperature, ambient light, weather information, indoor vs. outdoor, light signals, etc.), spatial topology data (e.g., placement of physical objects, location of walls and other obstructions, distances between objects, presence or absence of other humans or animals, spatial locations of other humans or animals, etc.), temporal data (e.g., time of day, time of year, date, etc.), and the like.

In another aspect, a virtual assistant may be engaged through the additional processing, which may serve in some cases to verify (e.g., confirm or discount) a virtual assistant engagement determination. For instance, additional processing may include but is not limited to the receipt and processing of contextual data, the application of a machine-learning algorithm, the determination of an engagement confidence level, and the like. In yet another aspect, a virtual assistant may be engaged through a combination of non-verbal and verbal signals, including, but not limited to, looking at a virtual assistant device while concurrently saying, "Hello." In another example aspect, a virtual assistant may be engaged while a user is not looking at the device, but is instead pointing towards a location and saying, "What is that?" Taking into consideration the spatial topology of the environment, the virtual assistant may be activated and provide a response to the user who is pointing. The systems and methods disclosed herein may utilize natural language processing concurrently with non-verbal signals to determine whether a user desires to engage with a virtual assistant. Additionally, at least one machine-learning algorithm may be employed to more accurately determine engagement with a virtual assistant.

FIG. 1 illustrates an example of a distributed system for non-verbally engaging a virtual assistant.

A system implementing a system for non-verbally engaging a virtual assistant may be executed on electronic devices including but not limited to client devices such as mobile phone 102, tablet 104, personal computer 106, and virtual assistant device 108. The disclosed system may receive non-verbal input data, including but not limited to, eye-gaze data, attributes of eye-gaze data, contextual data, and the like. Attributes of eye-gaze data may include, but are not limited to, eye-gaze signals, gestures, head position, facial features, facial expressions, and the like. Contextual data may include but is not limited to environmental topology data, spatial topology data, temporal data, and the like. The disclosed system may then process the non-verbal input locally, remotely, or using a combination of both. During processing, the disclosed system may rely on local and/or remote databases to determine whether to engage with a user and/or to formulate an appropriate response. This may be accomplished by utilizing local data (e.g., local datasets 110, 112, 114, 116) stored in local databases associated with client devices 102, 104, 106, 108, and/or remote databases stored on or associated with servers 118, 120, 122, or a combination of both.

For example, mobile phone 102 may utilize local dataset 110 and access servers 118, 120 and/or 122 via network(s) 124 to process the non-verbal input data and determine whether to activate the virtual assistant and provide a response. In other example aspects, tablet 104 may utilize local database 112 and network(s) 124 to synchronize the relevant features extracted from the processed non-verbal input data, as well as the subsequent determination to engage response virtual assistant, across client devices and/or across servers running a system for non-verbal engagement of the virtual assistant. For example, if the initial non-verbal input is received on tablet 104, the non-verbal input data and subsequent engagement determination and/or response determination may be saved locally in database 112, but also shared with client devices 102, 106, 108 and/or servers 118, 120, 122 via the network(s) 124.

In another example aspect, virtual assistant device 108 may receive non-verbal input. For example, the virtual assistant device 108 may receive eye-gaze data from a user. The at least one eye-gaze data may be processed by virtual assistant device 108, stored locally in database 116, and/or shared remotely, via network(s) 124, with other client devices 102, 104, and 106 and/or servers 118, 120, 122 via the network(s) 124. Additionally, the virtual assistant device 108 may receive the at least one eye-gaze attribute (e.g., eye-gaze signal, physical gesture, facial expression, head position, etc.) and determine that a user desires to engage with the virtual assistant. The virtual assistant device 108 may initially provide an incremental response, such as an indicator light, prompting the user to continue looking at the device, which may allow the virtual assistant device 108 to receive additional eye-gaze data and/or perform additional processing, thereby increasing the system's confidence that the user desires to engage with the virtual assistant. After a certain level of confidence is reached by virtual assistant device 108, the virtual assistant may provide a verbal response to the user. To confirm or discount an engagement determination, additional processing of the input may include, but is not limited to, determining at least one confidence level associated with the virtual assistant engagement determination, applying a machine-learning algorithm, collecting and evaluating contextual data, and the like. Once the virtual assistant is engaged, the user may proceed to interact with virtual assistant device 108.

If, for example, the user leaves the room where virtual assistant device 108 is located and subsequently enters another room where personal computer 106 is located, the virtual assistant dialogue between the user and virtual assistant device 108 may continue between the user and personal computer 106. After entering the room where personal computer 106 is located, personal computer may receive input indicating that the user has entered the room (e.g., through infrared signals, changes in spatial topology, mobile device signals, and the like). Upon entering the room, the virtual assistant, via personal computer 106, may continue engaging the user. In other example aspects, the virtual assistant may not engage with the user until a subsequent non-verbal input is received by personal computer 106. For example, upon entering the next room, a user may look over at personal computer 106, whereby personal computer 106 may receive at least one eye-gaze signal, infrared signal, facial recognition indication, and the like, that may prompt the virtual assistant to continue engaging the user in conversation. For example, the continuation of this dialogue may be possible through a distributed system architecture depicted in FIG. 1. For example, the user input data and virtual assistant device 108 response data may be stored in a remote database (e.g., on servers 118, 120, 122). Personal computer 106 may access that remote database, download the previously stored user input data and virtual assistant device 108 response data, and proceed to maintain the engagement with the user where the prior conversation between the user and virtual assistant device 108 left off. In other examples, the user input data and/or response data may be transmitted directly from the virtual assistant device 108 to the personal computer 106 via network(s) 124 (e.g., in response to a request by the personal computer 106). As should be appreciated, the above examples are provided for purposes of explanation and are not intended to be limiting.

In other example aspects, the non-verbal virtual assistant engagement system may be deployed locally. For instance, if the system servers 118, 120, and 122 are unavailable (e.g., due to network 124 being unavailable or otherwise), the virtual assistant engagement system may still operate on a client device, such as mobile device 102, tablet 104, computer 106, and/or virtual assistant device 108. In this case, a subset of the trained dataset applicable to the client device type (e.g., mobile device, tablet, laptop, personal computer, virtual assistant device, and the like) and at least a client version of the machine-learning algorithms may be locally cached so as to automatically respond to relevant features extracted from non-verbal input data on the client device. The system servers 118, 120, and 122 may be unavailable by user selection (e.g., intentional offline usage) or for a variety of other reasons, including, but not limited to, power outages, network failures, operating system failures, program failures, misconfigurations, hardware deterioration, and the like.

As should be appreciated, the various methods, devices, components, etc., described with respect to FIG. 1 are not intended to limit systems 100 to being performed by the particular components described. Accordingly, additional topology configurations may be used to practice the methods and systems herein and/or components described may be excluded without departing from the methods and systems disclosed herein.

Figure 2:
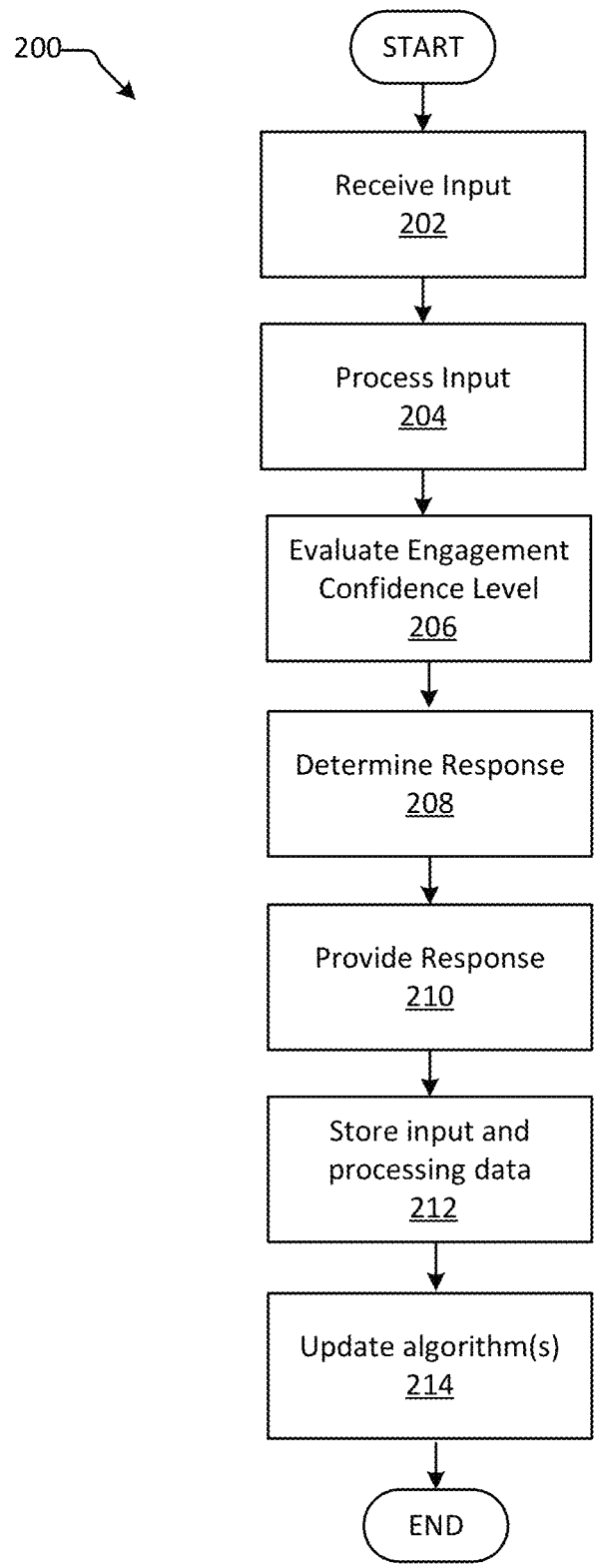
FIG. 2 is a block diagram illustrating a method for non-verbally engaging a virtual assistant.

FIG. 2 is a block diagram illustrating a method for non-verbally engaging a virtual assistant.

Method 200 may begin with receive input operation 202. The input received at operation 202 may include, but is not limited to, eye-gaze data, at least one attribute of eye-gaze data (e.g., eye-gaze signals, gestures, body movements, facial recognition data, head position data, facial expression data, etc.), contextual data (e.g., spatial topology changes, environmental data, light signals, etc.), speech-based input, historical input data and/or response data (e.g., for the specific user or based on generalized population data), and the like. In one example aspect, a virtual assistant device may receive a series of eye-gaze signals from a user. As used herein, a "virtual assistant device" may refer to a standalone, special-purpose virtual assistant device (e.g., virtual assistant device 108) or a virtual assistant application executing on a general-purpose electronic device (such as electronic devices 102, 104, 106). In some aspects, a virtual assistant device that is a standalone device may be configured to receive "far-field" input data, whereas a virtual assistant application executing on an electronic device may be configured to receive "near-field" input data. For example, a standalone virtual assistant device may be configured with various hardware (such as infrared, face recognition, eye-gaze or other hardware) that facilitates detection of input data (e.g., eye-gaze data, attributes of eye-gaze data, contextual data, etc.) from greater distances to the device, whereas a virtual assistant application running on an electronic device may have access to more limited hardware (e.g., an eye-gaze tracker) for detecting input data (e.g., eye-gaze data, attributes of eye-gaze data, contextual data, etc.) at a closer distance. As should be appreciated, an electronic device configured with or communicatively coupled to extended hardware may also be able to detect input data at greater distances from the electronic device.

In further examples, "far-field" input may refer to input data received from a greater distance to an electronic device and, at least in some aspects, may be more generalized input data (e.g., detection of a head position, a general direction of eye-gaze or a pronounced gesture, but not a specific eye-gaze location); whereas "near-field" input data may be more specific or detailed (e.g., detection of specific eye-gaze locations, or subtle finger gestures). For example, while near-field input data may include "gaze tracking" (where the eye tracking hardware is able to detect specific locations focused on by eye gaze, such as a virtual assistant icon on a user interface), far-field input data may include "gaze detection" (where motion detection or facial recognition hardware is able to detect that the user is looking in the general direction of a virtual assistant device).

In some aspects, the virtual assistant device may be in a "sleep" (i.e., inactive) mode prior to receiving the eye-gaze signals. In one example, upon receiving at least one eye-gaze signal, the virtual assistant device may provide a response back to the user in the form of an indicator light or a sound, notifying the user that the virtual assistant device is prepared to engage with the user. If the user continues to transmit eye-gaze signals to the virtual assistant device by looking at the virtual assistant device, the device may proceed to engage the user in the conversation. In another example, upon receiving at least one eye-gaze signal, the virtual assistant device may initiate engagement with the user (e.g., via a salutation such as, "Hello, how can I help you?"). In yet another example aspect, the virtual assistant device may engage a user based on the receipt of a gesture, such as a wave.

In addition to input data (e.g., eye gaze data, at least one attribute of the eye-gaze data, etc.), the virtual assistant device may also receive contextual data (or environmental topology data) through "additional processing," including, but not limited to, the time of day (e.g., AM or PM), weather forecast for the surrounding area (e.g., cloudy, sunny, or otherwise), which room in a house the virtual assistant device is located, etc. The engagement system may utilize this data to configure at least one hardware component to adapt to the environmental context. For instance, the engagement system may configure a high-resolution infrared camera component to account for less lighting because the current forecast is cloudy. For instance, environmental topology may include environmental topology receiving data such as a temperature reading, a weather forecast, an ambient light reading, and a distance between the user and the electronic device. In other example aspects, the engagement system may determine which hardware component to employ to receive subsequent data according to the received contextual data. For example, the engagement system may determine that due to the combination of ambient light and distance of the user from the virtual assistant device, employing a high resolution still camera device (e.g., DSLR) to receive head-position data allows for a more accurate transmission of input data rather than utilizing a high-resolution infrared camera component. In other example aspects, a combination of hardware component may be employed to receive input data. As should be appreciated, each detection technology, as implemented by the various hardware configurations described, may have associated performance characteristics that are affected by factors such as distance, weather, ambient lighting, temperature, or other environmental topologies. In some cases, engagement detection operations may be adapted automatically based on contextual data, e.g., by employing one detection method or hardware configuration over another based on the additional processing of contextual data.

In further examples, the input data that a virtual assistant device may receive may consist of previously stored data that may be transmitted directly from another client device, e.g., client devices 102, 104, 106, and 108, or remotely from a database, e.g., stored on servers 118, 120, and 122. The stored data may consist of user-specific data. For example, the virtual assistant device may receive a collection of previously captured images of the user's face, head poses and/or body position. In other instances, the virtual assistant may receive crowd-sourced images reflecting typical facial expressions (e.g., smiling, laughing, frowning, and the like), head poses (e.g., head back laughing, head toward chest in sadness or submission, head angled to one side or another questioning, and the like), and/or body positions (e.g., upright and confrontational, slouched and tired or submissive, stiff and uncomfortable, relaxed and comfortable, and the like). The virtual assistant device may utilize this collection of images to determine whether the user is currently looking at the device, which may indicate that the user wishes to engage with the device. In other example aspects, the device may receive previously stored data in the form of natural language (e.g., a textual transcript, audio file, and the like), which may represent a prior dialogue between a user and another virtual assistant device. For instance, as described previously, if a user is engaging with a virtual assistant on a first electronic device (e.g., a standalone virtual assistant device) and subsequently moves to another room and resumes engagement with the virtual assistant via a second electronic device (e.g., a personal computer, laptop computer, tablet device, mobile device, and the like), the second electronic device may receive any data associated with the interaction between the user and the first electronic device.

At process input operation 204, the input may be analyzed to determine at least one response from the virtual assistant device. For example, the device may receive one or more eye-gaze signals and locations associated with each of the one or more eye-gaze signals. If the locations of the eye-gaze signals are within a specified boundary associated with the virtual assistant device, the engagement system may determine that the user desires to engage with the virtual assistant device. In another example aspect, a virtual assistant device may receive at least one head-pose (or head position) location, wherein the head-pose location is within a certain boundary associated with the device. If, for example, a user's head is turned away from the virtual assistant device, the head-pose input may be processed to indicate that the user does not wish to engage with the virtual assistant device. When the user turns to look at the virtual assistant device, the head-pose input may be processed to indicate that the user does wish to engage with the virtual assistant. In some example aspects, a user may briefly turn away from the virtual assistant device, but the virtual assistant may remain engaged with the user. For example, the engagement system may be configured to allow deviations away from the virtual assistant device for a specified amount of time. In some instances, a virtual assistant device may be configured to disengage with a user after ten seconds have elapsed without input indicating that the user desires to initiate and/or maintain engagement with the virtual assistant. Alternatively, verbal cues may indicate to the virtual assistant device that the user intends to continue engagement even when eye gaze or other data is unavailable (e.g., when the user's back is turned or the user has left the room). In still other example aspects, the engagement system may rely on machine-learning algorithms, which are trained based on user-specific data, to allow for longer or shorter deviations depending on a user's speech patterns, contextual cues, and body language patterns, among other data.

In some example aspects, non-verbal input may be combined with verbal input. The verbal input may be additionally processed concurrently with the non-verbal input at process input operation 204. For example, the processing operation 204 may consist of applying at least one natural language processing ("NLP") algorithm to the input data. For instance, the engagement system may receive non-verbal cues (e.g., eye-gaze signals, head-pose locations, gestures, and the like) and at least one verbal cue (e.g., greeting, attention word(s), and the like). The NLP algorithm may process the at least one verbal cue, and the processing results may be used to determine whether the user desires to engage the virtual assistant device. For example, a user may appear to be looking in the direction of the virtual assistant device and may be speaking. When the virtual assistant device is configured to receive eye-gaze signals and head-pose locations from the user, the engagement system may receive the eye-gaze signals and head-pose locations, as well as the verbal output of the user. If the user speaks an attention word while looking at or in the direction of the virtual assistant device, the combination between the non-verbal input and attention word may increase the confidence of the engagement system that the user desires to engage with the virtual assistant, and as a result, may prompt the virtual assistant to provide a response back to the user. Alternatively, if the user says, "Joe, take a look at this," the NLP algorithm results may indicate to the engagement system that the user is not intending to engage the virtual assistant device, despite receipt of the user's eye-gaze signals and head-pose locations suggesting that the user desires to engage the virtual assistant. In some example aspects, the opposite may be true. A user may articulate the phrase, "Joe, take a look at this," but prior conversational history between the user and the virtual assistant device may indicate that the user intends to show Joe something associated with the virtual assistant device. Hence, the virtual assistant may remain engaged with the user.

The natural language processor of process input operation 204 may compare current verbal input with historical input for semantic and syntactic patterns to more accurately determine the meaning and intent of the verbal input. The NLP results may be used in conjunction with the non-verbal input to determine whether the user desires to engage with the virtual assistant device. Engaging with the virtual assistant device may comprise initiating a new conversation with the device and/or maintaining a conversation with the device.

Process input operation 204 may also be responsible for converting raw input data into machine-readable data. In some aspects, the machine-readable data may be stored on a local database, a remote database, or a combination of both. Process input operation 204 is further described in FIG. 3 with respect to the input processor.

Evaluate engagement confidence level operation 206 may receive the processing results from process input operation 204 and, through additional processing, may determine a confidence level of engagement between the user and the virtual assistant device. For example, if the processing results indicate that a series of eye-gaze signal were not fixated on the virtual assistant device for a certain period of time, then the confidence of the engagement system that the user desires to engage the virtual assistant may be lower. The confidence level of the engagement system may consider a fixation threshold in determining the level of confidence. A fixation threshold may be defined as a predetermined period of time required to activate the virtual assistant. Alternatively, if the processed input indicates that that a series of eye-gaze signals were clustered in a location fixated on the virtual assistant device or on a particular location of a virtual assistant user interface (e.g., executing on a computing device), the confidence of the engagement system that the user desires to engage the virtual assistant may be higher. The evaluation operation 206 may also consider other non-verbal input, such as head position, spatial topology data, environment-specific data, historical user-specific data, gestures, and the like. Additionally, the evaluation operation 206 may consider verbal input, such as spoken input from a user or users. In some cases, the evaluation operation 206 may concurrently consider both non-verbal and verbal input in evaluating the confidence level of the engagement system.

The confidence level of the engagement system may be based on a threshold. For example, based on a training set of data, the evaluation operation 206 may return the processing results as a value that is higher than a threshold value, which may indicate the user desires to engage the virtual assistant. Alternatively, the evaluation operation 206 may return the processing results as a value that is lower than a threshold value, which may indicate the user does not desire to engage the virtual assistant. In other example aspects, the evaluation operation 206 may reference at least one machine-learning algorithm to determine a threshold confidence level for determining whether a user intends to engage with a virtual assistant. For example, a user may have placed a virtual assistant device adjacent to a television screen. The received eye-gaze data (e.g., signal locations) between the virtual assistant device and the television screen may be similar. Over time, as the engagement system continues to collect data from the user and the surrounding environment, the engagement system may be trained to recognize when the user is intending to watch television and when the user is intending to engage with the virtual assistant device. As such, the initial confidence level threshold may be adjusted over time as more data is received and processed by a machine-learning algorithm or other processing system operating within the engagement system.

At determine response operation 208, a response may be determined by the engagement system. For example, if the processed results from process input operation 204 and the confidence level results from evaluation operation 206 indicate that the user desires to engage with the virtual assistant, then at least one response of engagement may be determined. For instance, the response may be an indicator light appearing on the virtual assistant device, indicating to the user that the virtual assistant detects that the user intends to engage with the virtual assistant. In other example aspects, the response may be an indicator sound. If the user continues to provide input directed to the virtual assistant device (e.g., eye-gaze signals, head-pose location, gestures, and the like), then a verbal response directed back to the user may be generated, e.g., "Hello, how can I help you?" In this instance, the virtual assistant may be deemed activated and fully engaged with the user until received input indicates that the user no longer desires to engage with the virtual assistant.

In further example aspects, the determined response may be a transmission of data from one device to another device. As discussed previously, a user may be currently engaged with a virtual assistant device (e.g., virtual assistant device 108) and may subsequently move to another room out of view from the virtual assistant device. Upon detecting that the user has exited the room, the virtual assistant device may transmit the previously stored input data (including conversational data) to another client device that may be located in the other room. Upon entering the other room and looking at the client device (e.g., laptop), the client device may receive the non-verbal input (e.g., head-pose, eye-gaze, or otherwise) from the user and may continue the conversational dialogue. In some example aspects, when the user enters another room, the engagement system may be expecting the user to continue the conversational dialogue with the client device. In this case, the engagement system may automatically lower the confidence threshold for engagement between the user and the client device, in some instances.

In other example aspects, the determined response may be to refrain from engaging the user. For instance, the input received and processed by method 200 may be sporadic eye-gaze signals, which may or may not register at a similar location. The evaluation operation 206 may register the processed results at a level of confidence for engagement below the threshold value. As such, the determined response may be to refrain from engaging with the user, as the input indicates that the user does not intend to engage with the virtual assistant. In some aspects, the input data, the processed results and the associated determination to refrain from engaging the user may be stored in a local or remote database for training one or more algorithms.

The determine response operation 208, it may also be determined whether the user intends to maintain a conversation with a virtual assistant device or conclude the conversation. For instance, a user engaging with a virtual assistant device and may subsequently turn his or her head away from the device, such that the eye-gaze signals and/or head-pose location of the user may indicate that the user does not want to continue engagement with the virtual assistant. However, the engagement system may consider other data besides contemporaneous non-verbal input data (such as eye-gaze signals or head-pose locations) in evaluating whether the user intends to continue or conclude a conversation with the virtual assistant device. In one instance, the engagement system may consider the substance of the conversational dialogue. If the user was in the middle of a sentence when the user entered another room or had previously asked a question and had not yet received a response from the virtual assistant device, the engagement system may determine that the user still intends to engage with the virtual assistant device. In one specific example, a user may be in the middle of asking a question to the virtual assistant, but may pause to think about how to phrase the rest of the question. During this pause, the user may turn away from the virtual assistant device and make a thinking gesture, e.g., rubbing hand on chin, scratching head, and the like. The virtual assistant device may receive the thinking gesture as user input and process that input. The processing results of the thinking gesture in combination with the NLP data regarding the conversational substance may cause the virtual assistant device to determine that the user does not want to discontinue engagement but needs a moment to think before continuing a dialogue with the virtual assistant. As such, the engagement system may automatically allocate a longer "hold" time before determining that the user no longer wishes to engage with the virtual assistant.

At provide response operation 210, the determined response from operation 208 may be provided. As previously discussed, the response may be a non-verbal response, such as the illumination of an indicator light on the virtual assistant device or the playing of an indicator sound. Other responses may consist of verbal responses that prompt the user to engage the virtual assistant in conversation (e.g., "Hello, how can I help you?"). Provide response operation 210 may provide a single response to a user while also providing a response to another electronic device (e.g., transmitting input data and/or processing results to another electronic device running the virtual assistant). As such, provide response operation 210 may be capable of providing multiple responses at the same or similar time. In one example aspect, an indicator light may illuminate and the virtual assistant may provide a verbal response to the user at the same or similar time.

At store input and processing data operation 212, the input data received and/or the processing results may be stored locally, remotely, or in a combination of local and remote databases. The input data and processing results may be stored for future access by at least one electronic device. The electronic device may be a client device running a virtual assistant application (e.g., client devices 102, 104, 106, 108), or the electronic device may be a server running a virtual assistant application (e.g., servers 118, 120, 122) and communicatively coupled to a client device. In some cases, the stored input data and/or processing results may be transmitted between different devices within the distributed network described in FIG. 1. Other devices running a virtual assistant application may utilize this stored data in determining how best to respond to certain users and/or environments. For example, the stored data and processing results may be utilized by at least one machine-learning algorithm. The at least one machine-learning algorithm may refer to the input data and/or processing results and may make updates accordingly, as described with respect to update algorithm(s) operation 214. As such, the at least one machine-learning algorithm associated with the engagement system may become more familiar with user-specific non-verbal inputs. For instance, the machine-learning algorithm may utilize data captured from a high-resolution still camera and compare previous data of classified color eye images with the currently captured data of classified color eye images. As a result, the accuracy of classification may increase over time as more data is stored and processed by the at least one machine-learning algorithm.

In aspects, the store input and processing data operation 212 may occur over multiple operations and may occur at earlier stages in the method. In one example aspect, the processing data may be stored immediately after the process input operation 204. In another example aspect, the determined response may be saved immediately after the determine response operation 208. Additionally, the store input and processing data operation 212 may occur at the same or similar time as the determine response operation 208 or the provide response operation 210.

At update algorithm(s) operation 214, the stored data and processing results are used to update at least one machine-learning algorithm. The at least one machine-learning algorithm may be shared across more than one client device and copied locally, so that the algorithm may operate during network downtimes. Input received from one client device may be used to update the at least one machine-learning algorithm, and the updated algorithm may be immediately transmitted to another client device (e.g., via network(s) 124 or via direct transmission via Bluetooth) so that the user may continue interacting with the most up-to-date virtual assistant regardless of which electronic device the user interacts.

As should be appreciated, the various methods, devices, components, etc., described with respect to FIG. 2 are not intended to limit method 200 to being performed by the particular components described. Accordingly, additional topology configurations may be used to practice the methods and systems herein and/or components described may be excluded without departing from the methods and systems disclosed herein.

Figure 3:
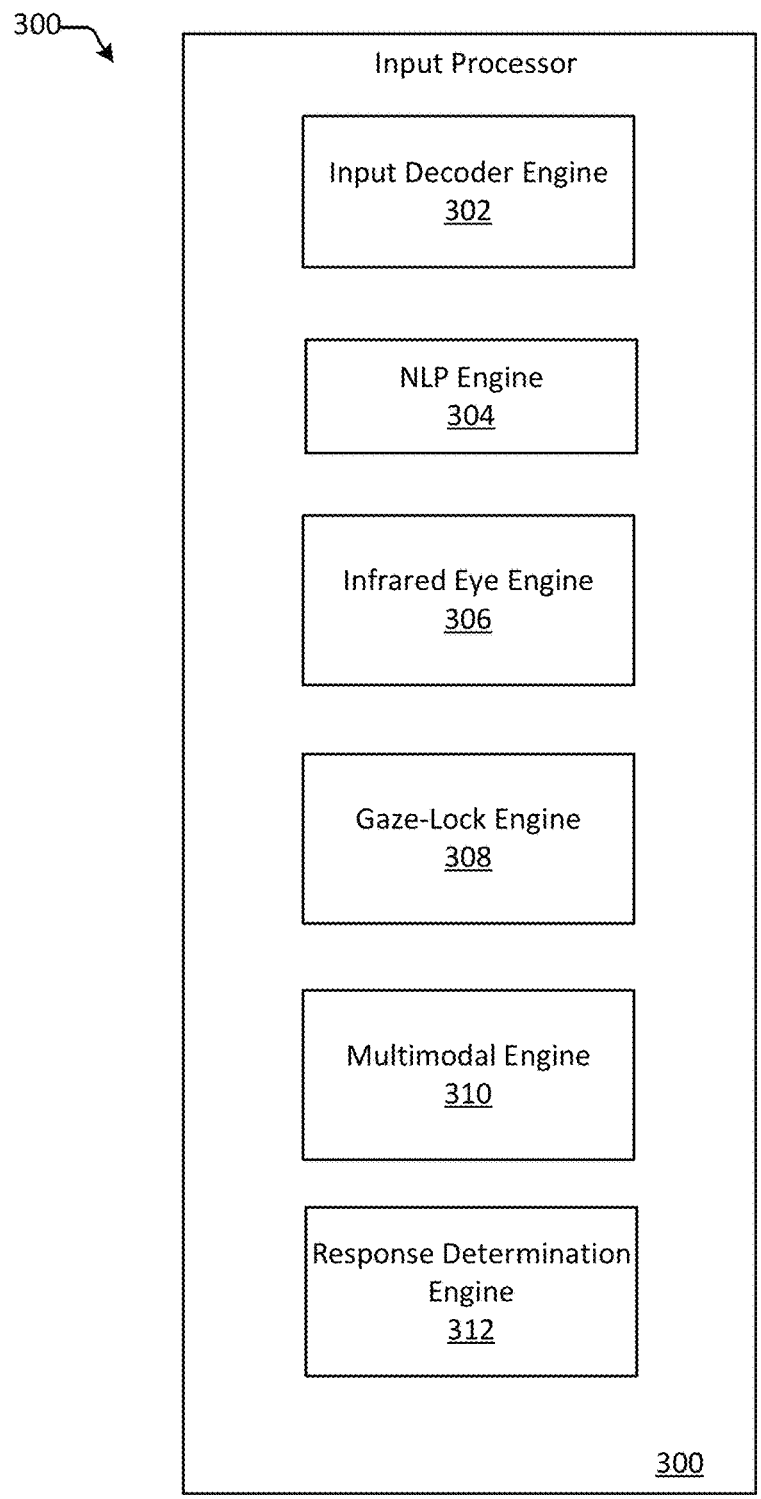
FIG. 3 is a block diagram illustrating an input processor.

FIG. 3 is a block diagram illustrating an input processor.

Input processing unit 300 is configured to receive inputs. In some example aspects, input processing unit 300 may be configured to process input data automatically according to at least one machine-learning algorithm that is trained on at least one dataset associated with at least one established database. The established database may consist of a selection of eye-gaze signals, thousands of pre-sorted images that indicate whether a person is looking at or away from a device, predefined gestures, etc. Eye gaze data may include, but is not limited to, eye fixation time, eye glint data, pupil dilation and constriction, blink rates, and corneal reflection, among others. The at least one machine-learning algorithm may be trained on a set of logical parameters that are associated with this established database. The inputs may include, but are not limited to, non-verbal input from a user, verbal input from a user, non-user input (e.g., third-party database input), and a combination of the aforementioned.

After input data is received by the input processor 300, the input decoder engine 302 may interpret the data. Input decoder engine 302 may interpret the data by determining whether the input data should be converted to machine-readable format. For example, the input received by input processor 300 may be in raw form, e.g., eye-gaze signals, gestures, verbal input, etc. The raw input may require conversion to machine-readable format before the processing may commence. The input decoder engine 302 may employ a data conversion scheme to convert raw input data into machine-readable format. For instance, the data conversion scheme may comprise normalizing the data and/or structuring the data so that the data may be consistently transmitted to and/or analyzed by other engines within input processor 300. If the input is determined to be in a pattern of machine-readable bits that requires no further conversion, the input may be transmitted to another engine within input processor 300 for further processing.

In other example aspects, the input decoder engine 302 may determine the source of the input data and sort the data accordingly prior to processing. For instance, a gesture received by one user may be classified by the input decoder engine 302 as belonging to a first user. A gesture received by another user may be classified by the input decoder engine 302 as belonging to a second user. At least one machine-learning algorithm or function within a machine-learning algorithm may be generated for a specific user. As such, pre-sorting the input according to a user may increase the processing efficiency of the engagement system disclosed herein.

In conjunction with a non-verbal user input, a verbal user input may be received. In the event that a verbal input is received by input processor 300, the input decoder engine 302 may determine that the verbal input should be processed by NLP engine 304. NLP engine 304 may parse the input data and extract various semantic features and classifiers, among other aspects of the input data, to determine whether the user desires to engage with the virtual assistant. The input data may be converted into semantic representations that may be understood and processed by at least one machine-learning algorithm to intelligently disassemble the input data and determine an appropriate response by the engagement system.

In other example aspects, the engagement system may utilize infrared eye engine 306 to process non-verbal input by a user. For instance, a strobed infrared illuminant co-located with a high-resolution infrared camera may be attached to, or in communication with, a virtual assistant device. The high-resolution camera may be used to detect whether the eyes of a user are looking in the direction of the virtual assistant device. In some aspects, such a high-resolution camera may be used for far-field input data or near-field input data. For instance, "gaze detection" may be performed by analyzing the reflection of the illuminant ("glint") at the center of the detected pupil. Light, typically, infrared, may be reflected from the eye and sensed by the high-resolution camera or another optical sensor. The information received by the high-resolution camera may transmitted to input processor 300, and subsequently processed by infrared eye engine 306. The gaze-detection input may be analyzed to extract eye rotations from changes in the reflections. In some example aspects, the infrared eye engine 306 may process the corneal reflection (the first Purkinje image) and center of the pupil. The engagement system may continuously track both the corneal reflection and center of the pupil repeatedly over a period of time to determine where (e.g., what direction) the user is looking. In another example aspect, the infrared eye engine 306 may be associated with a dual-Purkinje eye tracker, which analyzes reflections from the front of the cornea (the first Purkinje image) and the back of the lens (fourth Purkinje image) as gaze-detection features to track. In yet another example aspect, the infrared eye engine 306 may be associated with an optical device that tracks more detailed features of the eye, such as retinal blood vessels, and follows these features as the eye rotates.

Depending on the optical device that may be employed by the virtual assistant engagement system, the infrared eye engine 306 may be responsible for processing data associated with pupil tracking and/or corneal reflection. Additionally, the infrared eye engine 306 may also process and analyze data related to the torsional component (i.e., cyclo-rotation) by using polar cross correlation methods and iris pattern matching/tracking, among other methods known to one of ordinary skill in the art.

In other example aspects, the virtual assistant engagement system may utilize gaze-lock engine 308 in conjunction with specially designed hardware equipped to receive passive, appearance-based eye-contact signals, as well as head-pose locations. For instance, by utilizing a high-resolution camera that is configured to receive head-pose locations in conjunction with a machine-learning algorithm (e.g., support vector machine, or "SVM"), an accurate determination as to whether the user is looking at the virtual assistant device may be made. Initially, the gaze-lock engine 308 may receive the head-pose data and locate the eyes in each image received. The eyes may be transformed into a standard coordinate frame. In one example aspect, the eyes may be located in an image by taking the eye corner locations output from a commercial face and fiducial point detector. An affine transformation may be applied to coordinate frame within the image, and the two eye regions may be concatenated together to form a complete image. The gaze-lock engine 308 may proceed to mask out areas around the eyes to better determine where the user is looking. The mask may be a fixed-size ellipse with a major axis that lies on the line segment connecting the two eye corners. Following the application of the mask, the remaining pixel intensity values may be concatenated into a high-dimensional feature vector that may be normalized to unit magnitude. The unit-magnitude feature vector may represent the final representation of the eyes' appearance.

The gaze-lock engine 308 may proceed to project the high-dimensional feature vector onto a low-dimensional space via principal component analysis and/or multiple discriminant analysis. The projected vector may then be transmitted to at least one machine-learning algorithm, such as an SVM, operating within the gaze-lock engine 308. The at least one machine-learning algorithm may analyze the projected vector and determine whether the eyes are in gaze lock or not. If the at least one machine-learning algorithm determines that the projected vector is in gaze-lock, then the gaze-lock engine 308 may retrieve those results and transmit them to the Response Determination Engine 312, where the results may indicate that the user desires to interact with the virtual assistant device.

In other example aspects, the input processor 300 may utilize multimodal engine 310. For example, a user may desire to interact with a virtual assistant device but may not be looking at the virtual assistant device. As such, eye-contact and eye-gaze data may be unavailable to receive and process by the virtual assistant engagement system. As such, multimodal engine 310 may be utilized to determine whether the user intends to interact with the virtual assistant device by identifying and processing a variety of data, such as physical gestures, linguistic cues, spatial topology, and other visual resources. For instance, a user may be looking away from the virtual assistant device and pointing at a location away from the device, while simultaneously saying, "What is that?" If the virtual assistant engagement system identifies the user as the only person in the room (and perhaps an adjacent room where another virtual assistant device may be located), then the engagement system may determine that the user is intending to address the virtual assistant. As a result, the virtual assistant may respond accordingly. In another example aspect, the back of a user may be turned away from the virtual assistant, yet the user may still engage with the virtual assistant based on verbal input and/or body posture. Multimodal engine 310 may be compatible with various hardware devices that track physical movements using motion detection software and/or gesture recognition software. Multimodal engine 310 may also be associated with a high-resolution camera that utilizes image and signal processing to identify and process the layout of the surrounding environment. The layout of the surrounding environment may be processed and used to better determine whether a user is intending to engage a virtual assistant. For instance, if a virtual assistant device is placed in a living room, a user may frequently sit in a specific spot in the living room while engaging with the virtual assistant device. The more layouts that are captured of the living room with the user in a certain location may prompt the at least one machine-learning algorithm to expect engagement when a user is detected in that location in the environment. As such, when the engagement system detects that a user is in that location within the living room, the confidence level of engagement (as described in operation 206 of FIG. 2) may be automatically increased (and/or the threshold required for engagement may be decreased).

Multimodal engine 310 may also be compatible with optical sensory hardware (e.g., high-resolution cameras), as described in relation with infrared eye engine 306 and gaze-lock engine 308. Multimodal engine 310 may utilize this hardware in conjunction with other hardware features to more accurately determine a user's desire to engage or disengage with a virtual assistant.

Response determination engine 312 may be configured to receive processed input data. The processed input data may be delivered directly from input decoder engine 302 or through another of the input processor engines (e.g., NLP Engine 304, Infrared Engine 306, Gaze-Lock Engine 308, Multimodal Engine 310, etc.). The response determination engine 312 may consider the processed input data results in determining how best to respond to the input. For instance, a user may desire to initiate a conversation with a virtual assistant, and the input received from the user may be a series of eye-gaze signals and a hand gesture (e.g., wave). The input may be processed by infrared engine 306 and possibly multimodal engine 310. The processed results may be analyzed by response determination engine 312 to determine that the most appropriate response to provide to the user may be an engagement dialogue, such as "Hello, how can I be of assistance?" In another example aspect, a user may be in front of a computer screen watching a video. The computer may be running a virtual assistant. During the video, the user may ask "What is that?" Although the question does not include a "wake-up" word, the virtual assistant engagement system may receive the dialogue and promptly activate, responding to the user accordingly. The system may not only receive the user's verbal input, but the system may also receive the user's physical gesture of pointing to the screen and the screen contents (e.g., a series of screenshots may be captured and processed by the engagement system).

In another example aspect, multiple people may be together in a room with a virtual assistant device. The group of users may wish to collectively engage with the virtual assistant device. The device, through the use of infrared sensing, gaze-lock tracking, or other multimodal methods, may identify multiple eye-gaze signals, head-pose locations, and other input data indicating that a group of users desires to engage with the virtual assistant. The response determination engine 312 may then determine that the most appropriate response to the group of users is a verbal response that may address everyone: "Hello, everyone. How can I be of assistance?"

In yet another example aspect, a user may be conversing with other individuals in the same room as the virtual assistant device. The user may be quickly glance at the virtual assistant device and ask, "What's the weather like tomorrow?" The user may then resume conversing with another individual, turning his or her attention away from the virtual assistant device. The virtual assistant engagement system may receive the user input, both the verbal input and the non-verbal eye-gaze signals that may have accompanied the quick glance of the user. The input may be processed by input processor 300, and response determination engine 312 may then determine how to respond appropriately. In this specific instance, the quick glance may not have provided enough indication to the virtual assistant engagement system that the user desires to engage with the virtual assistant. If the response determination engine 312 is unsure as to whether the user intends to engage the virtual assistant, the response determination engine 312 may determine that a clarifying response inquiry may be the most appropriate response: "Excuse me, are you asking me about the weather?" In other example aspects, however, the at least one machine-learning algorithm may process the quick glance from the user and determine that the user does intend to engage the virtual assistant. As such, the response determination engine 312 may provide an immediate answer to the inquiry of the user: "The weather for tomorrow is 70 degrees with a slight chance of afternoon showers."

As should be appreciated, the various methods, devices, components, etc., described with respect to FIG. 3 are not intended to limit systems 300 to being performed by the particular components described. Accordingly, additional topology configurations may be used to practice the methods and systems herein and/or components described may be excluded without departing from the methods and systems disclosed herein.

Figure 4:
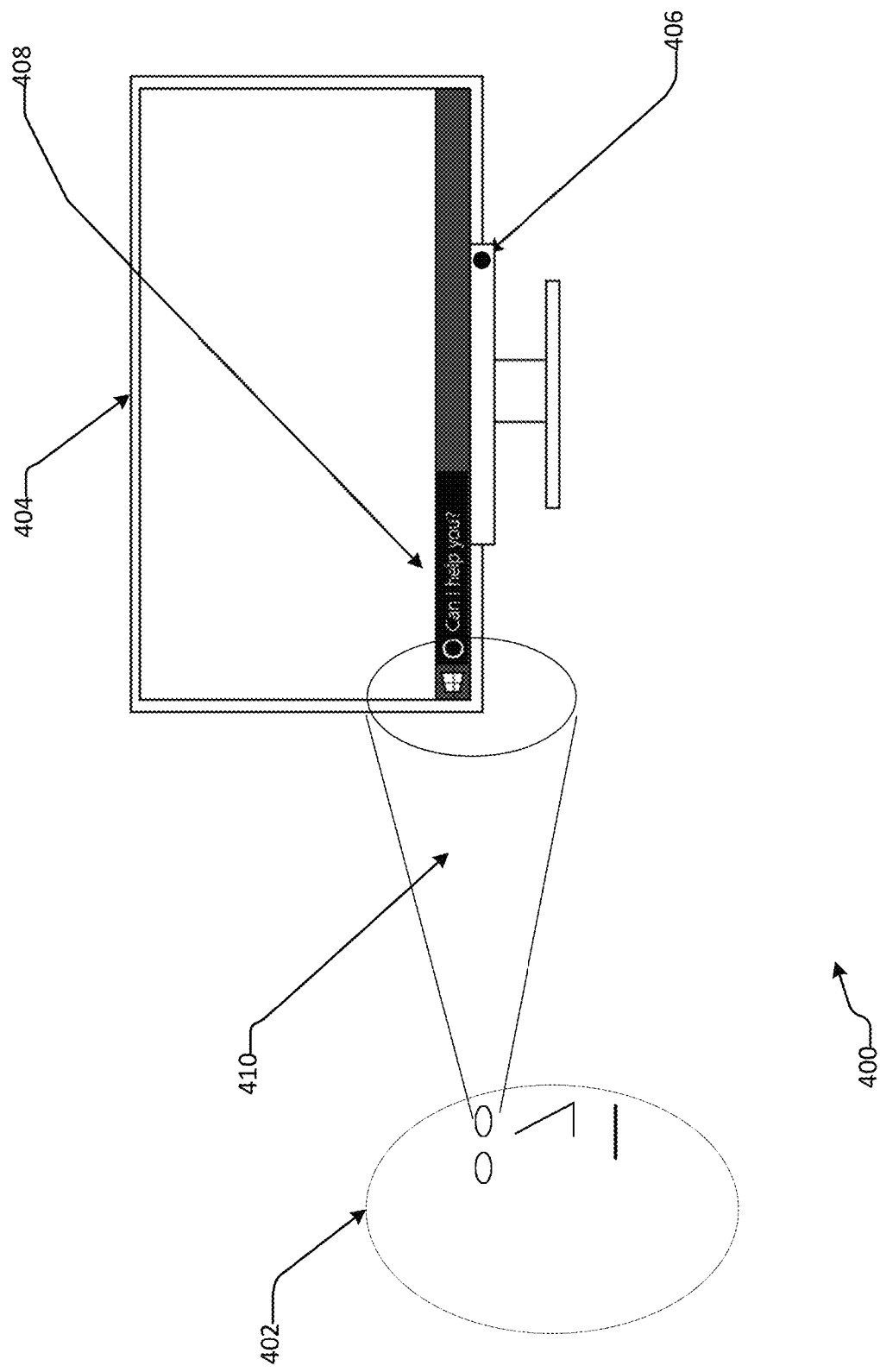
FIG. 4 illustrates an example of near-field engagement with a virtual assistant.

FIG. 4 illustrates an example of near-field engagement with a virtual assistant.

In some aspects, near-field engagement with a virtual assistant may comprise a user being within about one meter or less of an electronic device running a virtual assistant application. For example, user 402 may be within one meter of personal computer 404. Personal computer 404 may be equipped with eye-tracker hardware, such as eye-tracker device 406. Eye-tracker device 406 may be a high-resolution infrared sensing camera, or in other example aspects, it may be a high-resolution camera powered by a gaze-lock engine, such as gaze-lock engine 308. In some aspects, the eye-tracker hardware 406 that is built into personal computer 404 may be more adapted to support near-field engagement than far-field engagement. For instance, since a user typically engages with a personal computer by sitting within about one meter and facing a display device (or screen) of the personal computer, the eye-tracker hardware 406 may be configured to be most accurate when the user 402 is close in proximity to personal computer 404.

User 402 may engage the virtual assistant by looking at the virtual assistant search box 408 located in the bottom left of the screen. Eye-gaze 410 (represented by a peripheral triangular prism) of user 402 may be received by eye-tracker hardware 406 and processed by the virtual assistant engagement system. A response may be provided to the user based on the user input. For instance, a quick glance at the virtual assistant search box 408 may cause an indicator light to turn on. In other example aspects, it may cause a virtual assistant logo or other icon (e.g., a Cortana® logo) to light up on the screen, and the contents of the search box 408 may change to indicate that the virtual assistant is in a "ready" state. In yet other example aspects, the virtual assistant may immediately respond back to the user, either via textual output on the screen in search box 408, verbally through the speakers attached to personal computer 404, or a combination of both textual and verbal output.

Near-field engagement with a virtual assistant may also occur when a user is interacting with a laptop computer, mobile device or tablet, where a user tends to interact with such devices within a proximity of about one meter of the device. As such, built-in cameras may receive and process the input from the user to determine the most appropriate response to provide back to the user.

As should be appreciated, the various methods, devices, components, etc., described with respect to FIG. 4 is not intended to limit systems 400 to being performed by the particular components described. Accordingly, additional topology configurations may be used to practice the methods and systems herein and/or components described may be excluded without departing from the methods and systems disclosed herein.

Figure 5:
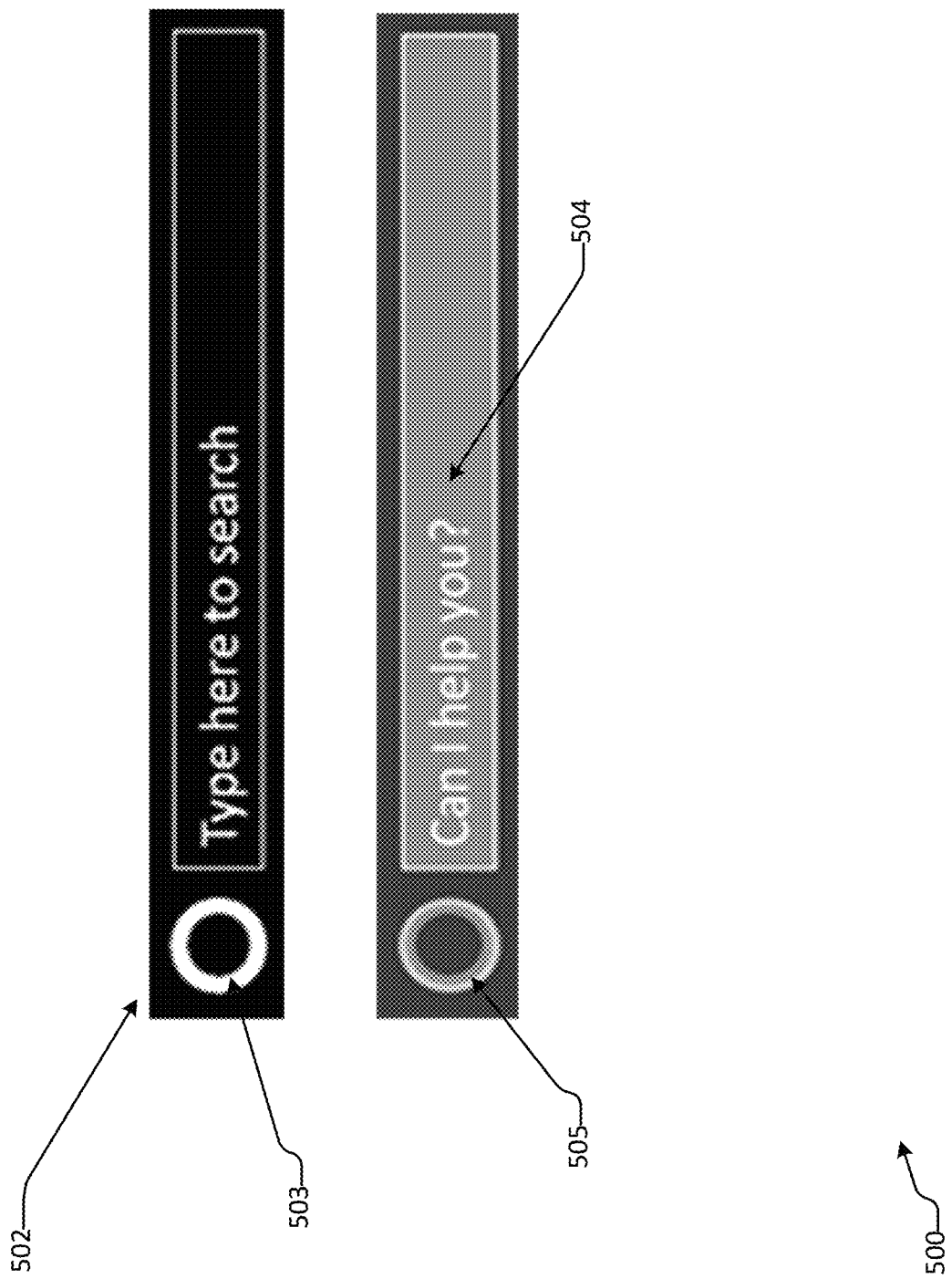
FIG. 5 illustrates an example of an engagement indication.

FIG. 5 illustrates an example of an engagement indication.

As previously described in FIG. 4, one of the many responses provided by the virtual assistant engagement system may be the illumination of an indicator light and perhaps a change in a virtual assistant search box. As illustrated, search box 502 shows a virtual assistant that is disengaged (or inactive). This may be evidenced by the grayed-out or non-illuminated virtual assistant icon 503. Alternatively, as illustrated, search box 504 shows a virtual assistant that is engaged, as evidenced by both the illuminated virtual assistant icon 505 and the engagement textual output located in the search box 504.

As should be appreciated, the various methods, devices, components, etc., described with respect to FIG. 5 is not intended to limit systems 500 to being performed by the particular components described. Accordingly, additional topology configurations may be used to practice the methods and systems herein and/or components described may be excluded without departing from the methods and systems disclosed herein.

Figure 6:
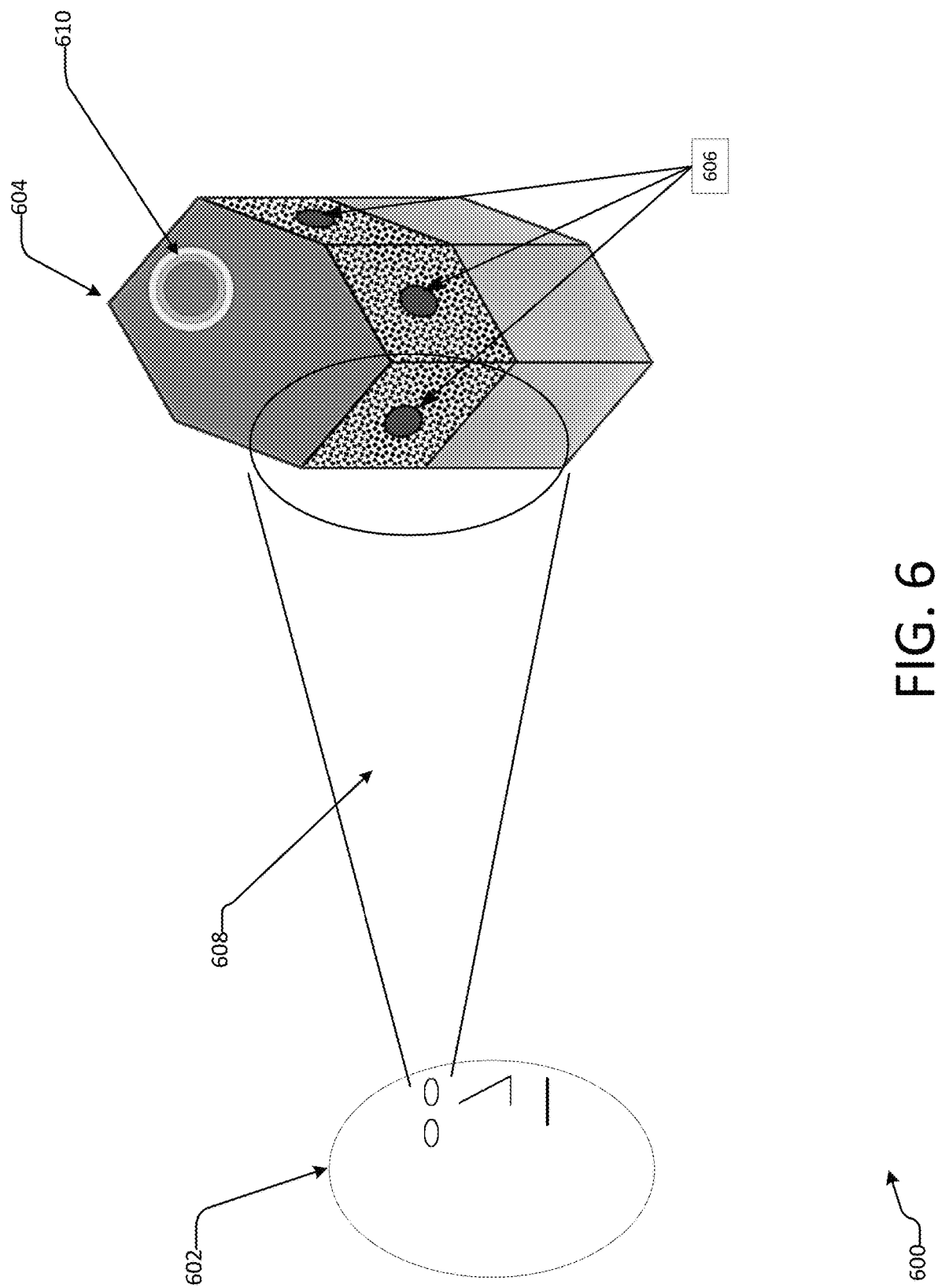
FIG. 6 illustrates an example of a far-field engagement with a virtual assistant.

FIG. 6 illustrates an example of a far-field engagement with a virtual assistant.

Far-field engagement allows a user to interact with a virtual assistant while farther away than one meter from the virtual assistant device. For instance, a user 602 may engage with virtual assistant device 604 by staring at the virtual assistant device 604. The cameras 606 located on the virtual assistant device may be high-resolution infrared cameras that are configured to capture eye-contact data and light reflections from distances of two to five meters. In other example aspects, the high-resolution cameras may be configured to capture gaze-lock data of the user. After a user focuses on the virtual assistant device 604 for a period of time, the virtual assistant 610 may engage the user. Initially, the virtual assistant engagement system may provide an indicator light. For instance, the virtual assistant device, or at least a portion of it, may illuminate. In another example aspect, the virtual assistant device may provide an indicator sound to inform the user that the virtual assistant is prepared to engage with the user.

Far-field engagement may also employ facial recognition technology. In some situations where multiple people are in a room together with a virtual assistant device, face recognition technology may allow the virtual assistant engagement system to discern when a particular user desires to engage with the virtual assistant. For example, the virtual assistant engagement system may be receiving multiple different dialogues from various people within the room, but once the engagement system detects the face of the user (e.g., owner) of the virtual assistant device, the engagement system may focus on that user's facial expressions in addition to any dialog received from the user. Specifically, the engagement system may employ the gaze-lock engine 308 to determine where (e.g., toward what direction and/or at what location within the environment) the user is looking. The engagement system may also employ the multimodal engine 310 to determine the shape of the user's lips if the user is speaking. In some instances, because of a heightened conversational volume, a virtual assistant device may be unable to isolate verbal input from a specific user. In this case, the engagement system may need to focus on the facial features and actions of the user to decipher the intent of the user to engage the virtual assistant, as well as the substance of any inquiry directed at the virtual assistant. In aspects, "facial features" may include but are not limited to distinguishing features enabling recognition of a particular individual (e.g., eye distance, nose shape and size, mouth placement and size, lip shape and size, and the like), facial expressions (e.g., smiling, frowning, speaking, laughing, and the like) and/or features of the eyes (e.g., eye color, pupil dilation, eye shape, eye size, etc.).

As should be appreciated, the various methods, devices, components, etc., described with respect to FIG. 6 is not intended to limit systems 600 to being performed by the particular components described. Accordingly, additional topology configurations may be used to practice the methods and systems herein and/or components described may be excluded without departing from the methods and systems disclosed herein.

Figure 7A:
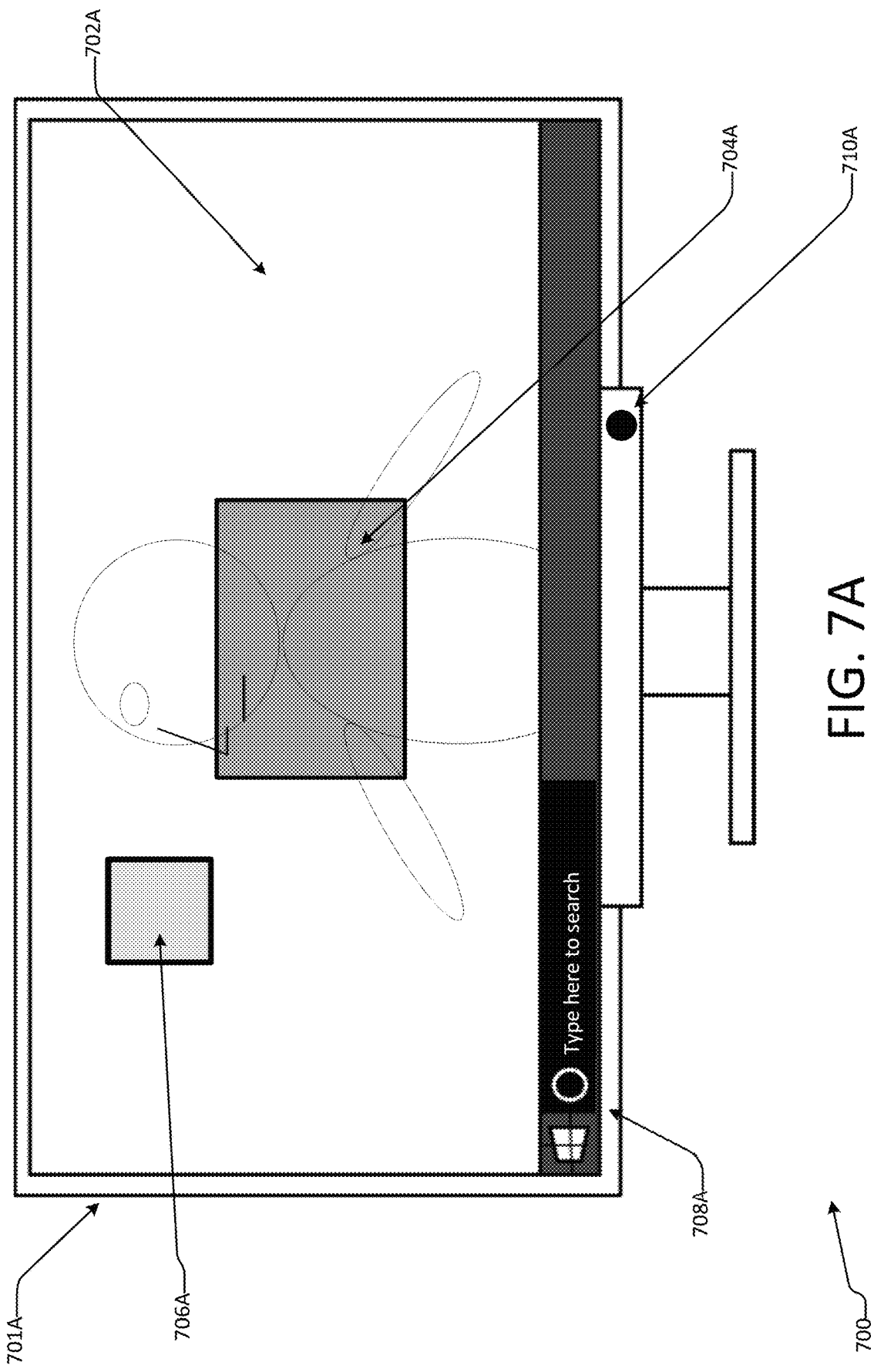
FIG. 7A illustrates an example of a non-engaged virtual assistant.

FIG. 7A illustrates an example of a non-engaged virtual assistant.

As illustrated, personal computer 701A comprises a feed 702A of an example of a detection process of a user who is not engaged with a virtual assistant. In some example aspects, the feed 702A may be displayed to the user. In other example aspects, the feed 702A may not be displayed to the user and operate internally to assist the engagement system with detection. The indicator box 704A may represent a detected gaze and/or proximity of the user to an engagement box 706A, which represents an outer boundary (or threshold) for engaging the virtual assistant. In some aspects, the indicator box 704A may track the head position and other spatial topological data, and the engagement box 706A may track the head-pose and eye-gaze of the user.

FIG. 7B illustrates an example of an engaged virtual assistant.

When alignment is achieved between indicator box 704B and engagement box 706B, the virtual assistant search bar 708B may illuminate. In some example aspects, an indicator noise may play. After the indicator box 704B is co-located within engagement box 706B for a predetermined period of time, the virtual assistant may be activated, as may be evidenced by a textual and/or graphical change in the virtual assistant search box 708B and/or a verbal output from the virtual assistant.

In some example aspects, eye-tracker hardware 710B may represent infrared optical hardware, high-resolution cameras configured for gaze-locking, an eye-gaze tracker, and/or a multimodal machine equipped with at least one sensor.

As should be appreciated, the various methods, devices, components, etc., described with respect to FIGS. 7A and 7B are not intended to limit systems 700 to being performed by the particular components described. Accordingly, additional topology configurations may be used to practice the methods and systems herein and/or components described may be excluded without departing from the methods and systems disclosed herein.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, as described herein.

Figure 8:
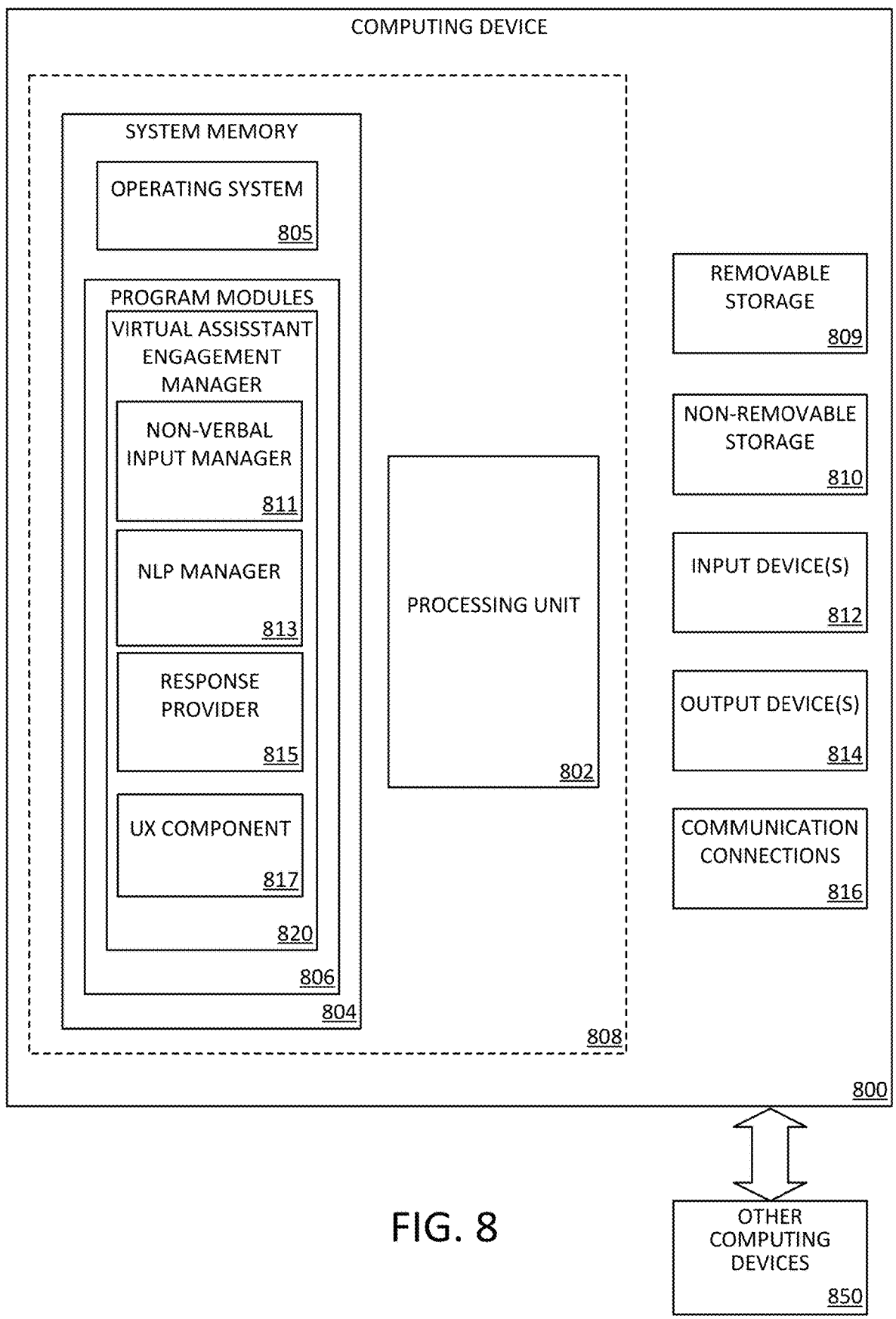
FIG. 8 is a block diagram illustrating example physical components of a computing device with which aspects of the disclosure may be practiced.

FIG. 8 is a block diagram illustrating example physical components (e.g., hardware) of a computing device 800 with which aspects of the disclosure may be practiced. The computing device components described below may have computer-executable instructions for implementing a virtual assistant engagement manager 820 on a computing device (e.g., server computing device and/or client computing device). The computer-executable instructions for an virtual assistant engagement manager 820 can be executed to implement the methods disclosed herein, including a method of receiving non-verbal input to determine engagement with a virtual assistant. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running a virtual assistant engagement manager 820, such as one or more components with regard to FIGS. 1-7, and, in particular, a non-verbal input manager 811, a Natural Language Processor (NLP) manager 813, a response provider 815, and/or UX Component 817.

The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., virtual assistant engagement manager 820) may perform processes including, but not limited to, the aspects, as described herein. Other program modules that may be used in accordance with aspects of the present disclosure, and in particular for receiving non-verbal input to determine engagement with a virtual assistant, may include a non-verbal input manager 811, an NLP manager 813, a response provider 815, and/or UX Component 817, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such tangible computer storage media may be part of the computing device 800. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
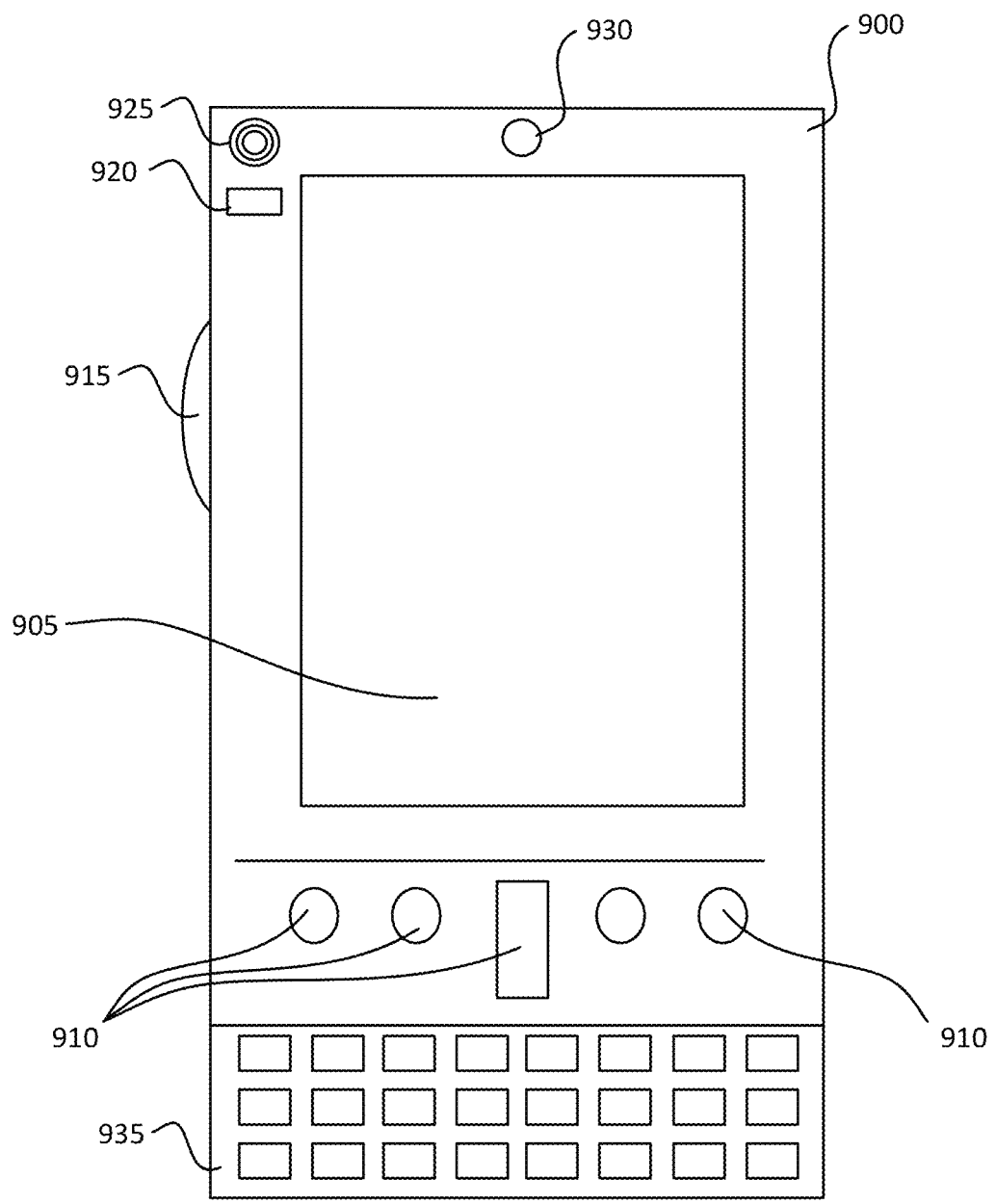
FIGS. 9A and 9B are simplified block diagrams of a mobile computing system in which aspects of the present disclosure may be practiced.
Figure 9B:
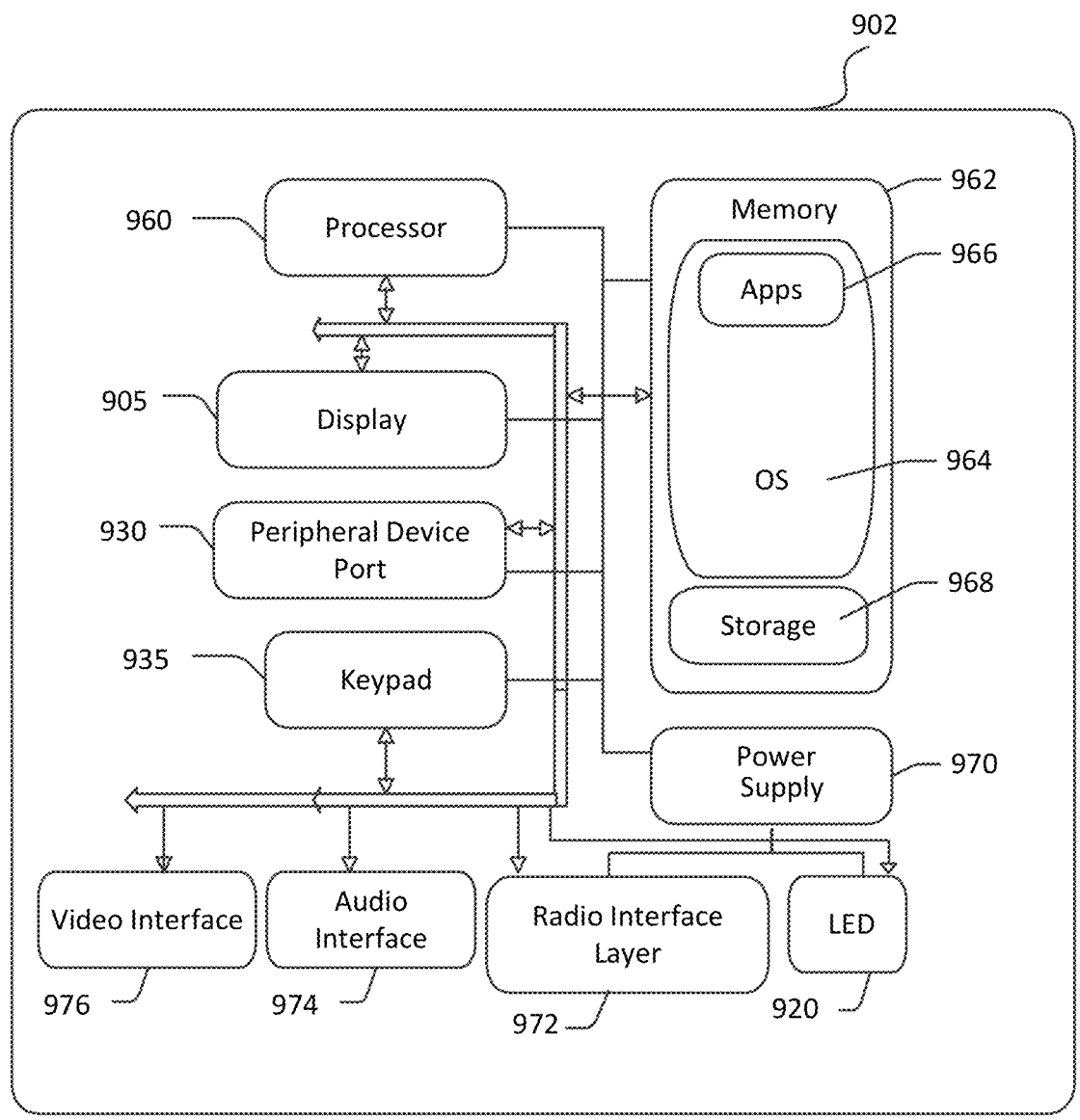

FIGS. 9A and 9B illustrate a mobile computing device 900, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as email or other messages used by an email application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the instructions for receiving non-verbal input to determine engagement with a virtual assistant as described herein (e.g., non-verbal input manager 811, an NLP manager 813, a response provider 815, and/or UX Component 817, etc.).

The system 902 has a power supply 970, which may be implemented as one or more batteries. The power supply 970 may further include an external power source, such as an AC adapter or a powered docking cradle that supplements or recharges the batteries. The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via an audio transducer 925 (e.g., audio transducer 925 illustrated in FIG. 9A). In the illustrated embodiment, the visual indicator 920 is a light emitting diode (LED) and the audio transducer 925 may be a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of peripheral device 930 (e.g., on-board camera) to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

As should be appreciated, FIGS. 9A and 9B are described for purposes of illustrating the present methods and systems and are not intended to limit the disclosure to a particular sequence of steps or a particular combination of hardware or software components.

Figure 10:
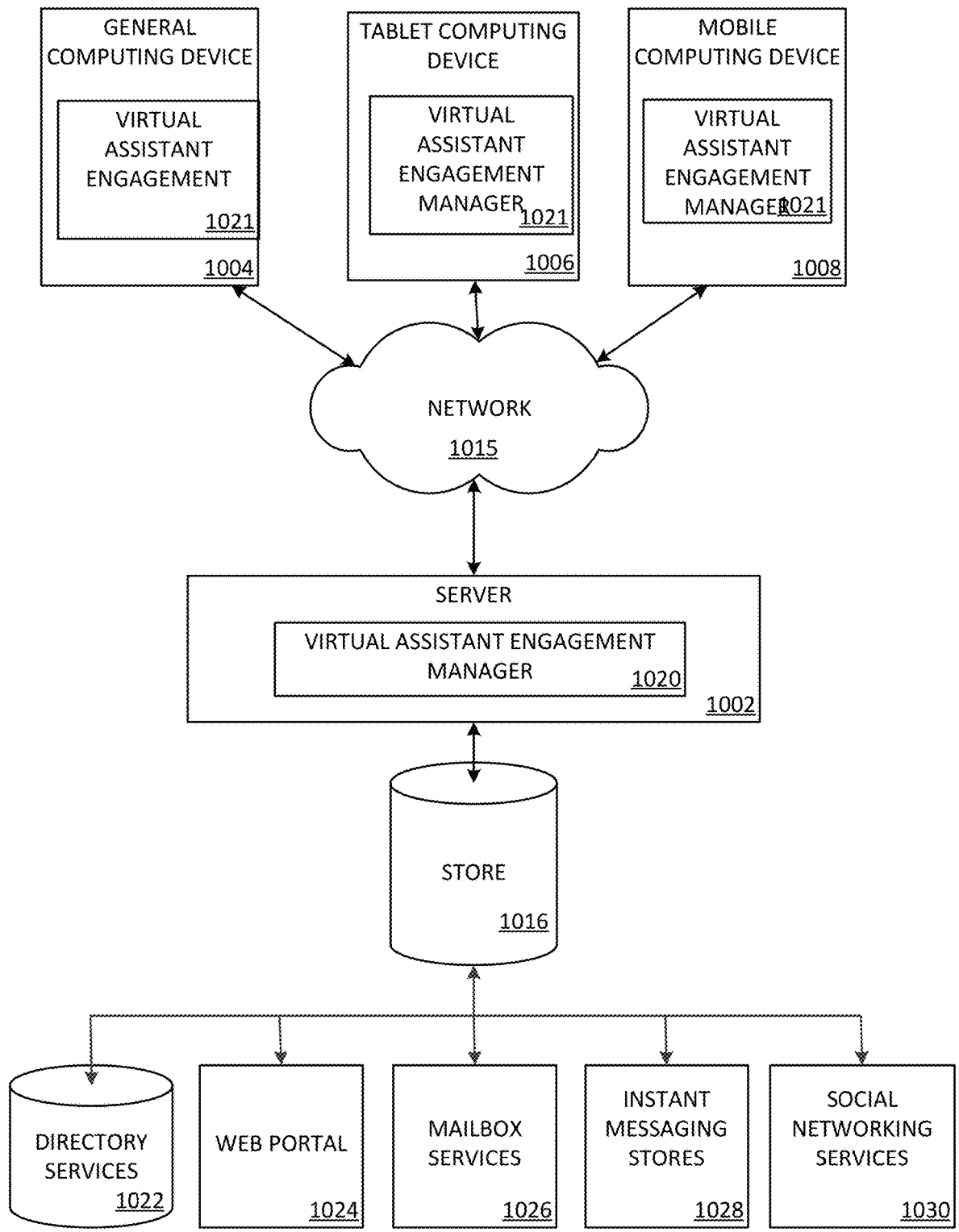
FIG. 10 is a simplified block diagram of a distributed computing system in which aspects of the present disclosure may be practiced.

FIG. 10 illustrates one aspect of the architecture of a system for processing data received at a computing system from a remote source, such as a general computing device 1004 (e.g., personal computer), tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking service 1030. The virtual assistant engagement manager 1021 may be employed by a client that communicates with server device 1002, and/or the virtual assistant engagement manager 1020 may be employed by server device 1002. The server device 1002 may provide data to and from a client computing device such as a general computing device 1004, a tablet computing device 1006 and/or a mobile computing device 1008 (e.g., a smart phone) through a network 1015. By way of example, the computer system described above with respect to FIGS. 1-9 may be embodied in a general computing device 1004 (e.g., personal computer), a tablet computing device 1006 and/or a mobile computing device 1008 (e.g., a smart phone). Any of these embodiments of the computing devices may obtain content from the store 1016, in addition to receiving graphical data useable to either be pre-processed at a graphic-originating system or post-processed at a receiving computing system.

As should be appreciated, FIG. 10 is described for purposes of illustrating the present methods and systems and is not intended to limit the disclosure to a particular sequence of steps or a particular combination of hardware or software components.

Figure 11:
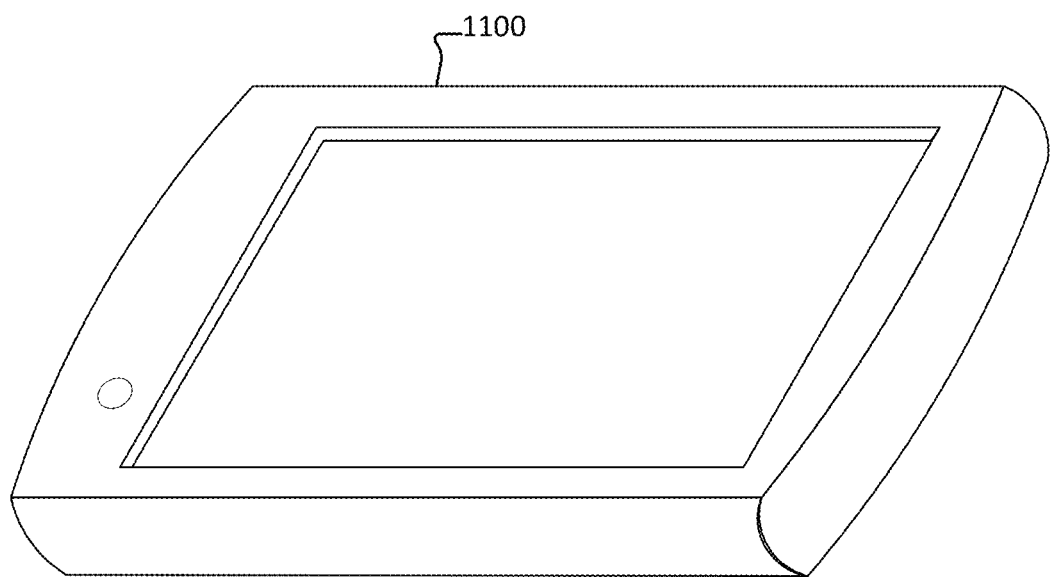
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 11 is described for purposes of illustrating the present methods and systems and is not intended to limit the disclosure to a particular sequence of steps or a particular combination of hardware or software components.

The embodiments of the disclosure described herein are implemented as logical steps in one or more computer systems. The logical operations of the present disclosure are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosure. Accordingly, the logical operations making up the embodiments of the disclosure described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the disclosure. Since many embodiments of the disclosure can be made without departing from the scope of the disclosure, the disclosure resides in the claims hereinafter appended. Furthermore, structural features of the different embodiments may be combined in yet another embodiment without departing from the recited claims.

What is claimed is:

1. A processor-implemented method for engaging a virtual assistant device, comprising:
   receiving, by the virtual assistant device, eye-gaze data of a user as input;
   upon receiving the eye-gaze data, collecting topology data associated with the electronic device, wherein the topology data is not collected using a head-mounted display;
   analyzing one or more attributes of the eye-gaze data to determine whether the user intends to engage the virtual assistant device, wherein the analyzing comprises comparing an alignment of an engagement area associated with the virtual assistant device to an indicator area for detecting at least one of: the eye-gaze data or user proximity to the virtual assistant device, wherein the virtual assistant device is engaged when the engagement area and the indicator area are aligned; and
   initiating a conversation with the user based on the one or more attributes of the eye-gaze data and the topology data, wherein initiating the conversation comprises providing a salutation to the user.

2. The processor-implemented method of claim 1, wherein initiating the conversation comprises:
   determining a response, wherein the response comprises at least one of: a verbal response, a transmission of data, and a non-verbal indication; and
   providing the response to the user via the virtual assistant.

3. The processor-implemented method of claim 1, wherein verifying that the user intends to engage the virtual assistant is based on applying at least one machine-learning algorithm.

4. The processor-implemented method of claim 1, further comprising:
   in response to initiating the conversation with the user, receiving, from the user, a response maintaining the conversation.

5. The processor-implemented method of claim 1, wherein the one or more attributes of the eye-gaze data comprise at least two of: an eye-gaze signal, a facial feature, a facial expression, a gesture, or a body posture of a user.

6. The processor-implemented method of claim 5, wherein analyzing the facial feature comprises evaluating at least one of: an eye feature, gaze-locking, or infrared eye reflection.

7. The processor-implemented method of claim 1, further comprising:
   determining an engagement confidence level indicated by the eye-gaze data.

8. The processor-implemented method of claim 1, further comprising:
   monitoring multiple users in proximity to the virtual assistant device.

9. The processor-implemented method of claim 8, wherein monitoring multiple users includes utilizing facial-recognition technology.

10. The processor-implemented method of claim 1, wherein the virtual assistant is configured to receive near-field user input via a first input detection mechanism of the virtual assistant and far-field user input via a second input detection mechanism of the virtual assistant.

11. The processor-implemented method of claim 10, wherein the first input detection mechanism is a first hardware device and the second input detection mechanism is a second hardware device that is different from the first hardware device.

12. The processor-implemented method of claim 1, wherein the user-specific data comprise previously captured images of at least one of: the user's face, the user's head poses, or the user's body position.

13. A system comprising:
    a processor; and
    memory coupled to the processor, the memory comprising computer executable instructions that, when executed, perform a method comprising:
    receiving, by the virtual assistant device, eye-gaze data of a user as input;
    upon receiving the eye-gaze data, collecting topology data associated with the electronic device, wherein the topology data is not collected using a head-mounted display;
    analyzing one or more attributes of the eye-gaze data to determine whether the user intends to engage the virtual assistant device, wherein the analyzing comprises comparing an alignment of an engagement area associated with the virtual assistant device to an indicator area for detecting at least one of: the eye-gaze data or user proximity to the virtual assistant device, wherein the virtual assistant device is engaged when the engagement area and the indicator area are aligned; and
    initiating a conversation with the user based on the one or more attributes of the eye-gaze data and the topology data, wherein initiating the conversation comprises providing a salutation to the user.

14. The system of claim 13, wherein initiating the conversation comprises:
    determining a response, wherein the response comprises at least one of: a verbal response, a transmission of data, and a non-verbal indication; and
    providing the response to the user via the virtual assistant.

15. The system of claim 13, wherein verifying that the user intends to engage the virtual assistant is based on applying at least one machine-learning algorithm.

16. The system of claim 13, wherein the one or more attributes of the eye-g gaze data comprise at least two of: an eye-gaze signal, a facial feature, a facial expression, a gesture, or a body posture of a user.

17. The system of claim 16, wherein analyzing the facial feature comprises evaluating at least one of: gaze-locking or infrared eye reflection.

18. A virtual assistant storing instructions that when executed by one or more processors of a computing device perform a method for analyzing eye-gaze input, the method comprising:
    receiving, by the virtual assistant device, eye-gaze data of a user as input;
    upon receiving the eye-gaze data, collecting topology data associated with the electronic device, wherein the topology data is not collected using a head-mounted display;
    analyzing one or more attributes of the eye-gaze data to determine whether the user intends to engage the virtual assistant device, wherein the analyzing comprises comparing an alignment of an engagement area associated with the virtual assistant device to an indicator area for detecting at least one of: the eye-gaze data or user proximity to the virtual assistant device, wherein the virtual assistant device is engaged when the engagement area and the indicator area are aligned; and initiating a conversation with the user based on the one or more attributes of the eye-gaze data and the topology data, wherein initiating the conversation comprises providing a salutation to the user.

19. The virtual assistant of claim 18, wherein the virtual assistant is configured to monitor multiple users in proximity to the virtual assistant.

20. The virtual assistant of claim 19, wherein monitoring the multiple users includes utilizing facial-recognition technology.

* * * * *